US008616585B2

(12) United States Patent
Stefani et al.

(10) Patent No.: US 8,616,585 B2
(45) Date of Patent: Dec. 31, 2013

(54) PIPE COUPLING

(75) Inventors: Yves Stefani, Vanves (FR); Roland Lucotte, Bussieres (FR)

(73) Assignees: Saint-Gobain Performance Plastics Corporation, Aurora, OH (US); Saint-Gobain Performance Plastics ASTI, Nanterre (FR)

( * ) Notice: Subject to any disclaimer, the term of this patent is extended or adjusted under 35 U.S.C. 154(b) by 0 days.

(21) Appl. No.: 13/282,102

(22) Filed: Oct. 26, 2011

(65) Prior Publication Data

US 2012/0098255 A1 Apr. 26, 2012

Related U.S. Application Data

(62) Division of application No. 12/262,087, filed on Oct. 30, 2008, now Pat. No. 8,104,796.

(60) Provisional application No. 60/984,003, filed on Oct. 31, 2007.

(30) Foreign Application Priority Data

Oct. 31, 2007 (FR) ..................................... 07 07658

(51) Int. Cl.
*F16L 23/02* (2006.01)
*F16L 23/12* (2006.01)

(52) U.S. Cl.
USPC .............................. 285/55; 285/368; 285/412

(58) Field of Classification Search
USPC ........................................... 285/55, 368, 412
See application file for complete search history.

(56) References Cited

U.S. PATENT DOCUMENTS

| | | | |
|---|---|---|---|
| 1,542,940 | A | 6/1925 | Hughes |
| 2,146,218 | A | 12/1935 | Kimmich et al. |
| 2,070,291 | A | 2/1937 | Patrick |
| 2,757,966 | A | 8/1956 | Samiran |
| 3,047,937 | A | 8/1962 | De Vecchi |

(Continued)

FOREIGN PATENT DOCUMENTS

| | | | |
|---|---|---|---|
| CN | 2315365 | Y | 4/1999 |
| CN | 2343429 | Y | 10/1999 |

(Continued)

OTHER PUBLICATIONS

International Search Report for PCT/US2008/081869 dated Feb. 20, 2009.

(Continued)

*Primary Examiner* — James Hewitt

(74) *Attorney, Agent, or Firm* — Abel Law Group, LLP; Chi Suk Kim

(57) ABSTRACT

A pipe joint includes a first pipe that includes a first flange and a second pipe that includes a second flange. A first sleeve is installed within the first pipe and a second sleeve is installed within the second pipe. Further, an annular ring is positioned between the flange of the first pipe and the flange of the second pipe. The annular ring includes a first hub that extends into the first pipe and a second hub that extends into the second pipe. Moreover, a first complementary engagement structure is formed between the first sleeve and the first hub of the annular ring. The first complementary engagement structure provides a first seal interface within the pipe joint. A second complementary engagement structure is formed between the second sleeve and the second hub of the annular ring. The second complementary engagement structure provides a second seal interface within the pipe joint.

14 Claims, 26 Drawing Sheets

(56) References Cited

U.S. PATENT DOCUMENTS 3,144,040 A 8/1964 Morgan
3,197,174 A 7/1965 Killian
3,241,806 A 3/1966 Snell
3,253,841 A 5/1966 Ahmad
3,329,398 A 7/1967 Goldsmith
3,393,697 A 7/1968 Fawkes
3,539,148 A 11/1970 Boos, Jr.
3,583,670 A 6/1971 Manske
3,612,483 A 10/1971 Pool
3,656,769 A 4/1972 Jelinek et al.
3,666,233 A 5/1972 Scaramucci
3,666,236 A 5/1972 Gachot
3,702,199 A 11/1972 Brooks
3,744,753 A 7/1973 Clow et al.
3,774,880 A 11/1973 Crookham et al.
3,790,130 A 2/1974 Getty
3,799,501 A 3/1974 Hartman
3,902,697 A 9/1975 Robinson
3,945,390 A 3/1976 Huber
3,958,314 A 5/1976 Kurkjian, Jr.
3,967,812 A 7/1976 Newell et al.
3,977,708 A 8/1976 Jopp
4,006,883 A 2/1977 Hilsheimer
4,055,323 A 10/1977 Gachot
4,108,479 A 8/1978 Straub
4,162,782 A 7/1979 Wilkins
4,216,980 A 8/1980 Shreve
4,227,675 A 10/1980 Sutter et al.
4,259,980 A 4/1981 Muller
4,266,752 A 5/1981 Johnson
4,266,753 A 5/1981 Okada
4,266,754 A 5/1981 Ninomiya et al.
4,306,706 A 12/1981 Olansen et al.
4,325,414 A 4/1982 Schaefer
4,336,958 A 6/1982 Goetzinger
4,348,006 A 9/1982 Schmitt et al.
4,358,086 A 11/1982 Hiltebrand
4,398,695 A 8/1983 Torche
RE31,417 E 10/1983 Huber
4,411,407 A 10/1983 Ninomiya et al.
4,457,490 A 7/1984 Scobie
4,462,568 A 7/1984 Taylor et al.
4,465,260 A 8/1984 Conley et al.
4,531,710 A 7/1985 Tort
4,575,046 A 3/1986 Krause et al.
4,634,097 A 1/1987 Hubertson
4,674,528 A 6/1987 Nishio et al.
4,676,481 A 6/1987 Hayes
4,699,177 A 10/1987 Thomas
4,699,357 A 10/1987 Sisk
4,702,498 A 10/1987 Mueller et al.
4,740,347 A 4/1988 Sloan et al.
4,759,530 A 7/1988 Iff
4,763,877 A 8/1988 Kennedy
4,773,306 A 9/1988 Dirkin
4,784,411 A 11/1988 Tueckmantel
4,796,857 A 1/1989 Hayes et al.
4,813,650 A 3/1989 Dingler
4,822,001 A 4/1989 Sisk
4,848,802 A 7/1989 Wolf et al.
5,058,931 A 10/1991 Bowsher
5,118,078 A 6/1992 Younker
5,152,501 A 10/1992 Raymond, Jr.
5,160,118 A 11/1992 Stary
5,180,193 A 1/1993 Rung et al.
5,199,153 A 4/1993 Schulte-Ladbeck
5,224,738 A 7/1993 Taga
5,295,659 A 3/1994 Steele
5,297,773 A 3/1994 Collins
5,470,111 A 11/1995 Nelson et al.
5,478,047 A 12/1995 Best et al.
5,489,631 A 2/1996 Dubois
5,511,797 A 4/1996 Nikirk et al.
5,532,299 A 7/1996 Dubois
5,549,276 A 8/1996 Pittman et al.
5,553,830 A 9/1996 Stary
5,573,282 A 11/1996 Egner et al.
5,577,742 A 11/1996 Nicholson et al.
5,645,301 A 7/1997 Kingsford et al.
5,649,567 A 7/1997 Butler et al.
5,685,520 A 11/1997 Velan
5,738,336 A 4/1998 McKnight et al.
5,876,070 A 3/1999 McNealy et al.
5,979,872 A 11/1999 Stearns et al.
5,996,636 A 12/1999 Fukano et al.
5,997,049 A 12/1999 Kingsford et al.
6,029,949 A 2/2000 Brown et al.
6,183,021 B1 2/2001 Walsh et al.
6,186,476 B1 2/2001 Goldsweer et al.
6,189,860 B1 2/2001 Sato et al.
6,312,024 B1 11/2001 Dutilleul et al.
6,409,222 B1 6/2002 Donoho et al.
6,412,832 B1 7/2002 Donoho et al.
6,523,863 B2 2/2003 Ishiwata
6,607,179 B2 8/2003 Moretti et al.
6,642,451 B1 11/2003 Gretz
6,692,036 B2 2/2004 Kingsford et al.
6,726,177 B2 4/2004 Wang
6,832,762 B2 12/2004 Jost
6,966,537 B2 11/2005 Sundararajan
6,976,712 B2 12/2005 Lukach, Jr.
7,036,204 B2 5/2006 Fischer et al.
7,059,585 B2 6/2006 Dalluge et al.
7,107,662 B1 9/2006 Levario
8,104,796 B2 1/2012 Stefani et al.
2001/0032956 A1 10/2001 Khokhar
2001/0052700 A1 12/2001 Starita
2002/0070544 A1 6/2002 Kingsford et al.
2002/0079693 A1 6/2002 Spiering et al.
2002/0130290 A1 9/2002 Oberbeck
2002/0163193 A1 11/2002 Abuellel
2003/0015681 A1 1/2003 Chatufale
2003/0062500 A1 4/2003 Eggleston et al.
2003/0075876 A1 4/2003 Gonsior
2004/0080160 A1 4/2004 Rief
2005/0073145 A1 4/2005 Boudry et al.
2005/0151107 A1 7/2005 Shu
2005/0212284 A1 9/2005 Dole
2005/0242317 A1 11/2005 Malki et al.
2005/0247349 A1 11/2005 Barrows et al.
2006/0038155 A1 2/2006 Lam
2007/0007768 A1 1/2007 Ho
2009/0127851 A1 5/2009 Stefani et al.
2009/0184476 A1 7/2009 Stefani et al.
2010/0308248 A1 12/2010 Stefani et al.

FOREIGN PATENT DOCUMENTS

CN 2428639 Y 5/2001
CN 2436729 Y 6/2001
CN 1611818 A 5/2005
DE 2030263 A1 12/1971
DE 3623310 C2 5/1990
DE 4417669 A1 11/1995
DE 19637083 A1 3/1998
DE 19727236 A1 1/1999
DE 202005002511 U1 6/2005
EP 0037533 B1 10/1981
EP 0498315 A3 10/1992
EP 0591687 A1 4/1994
EP 0905428 B1 3/1999
EP 774090 B1 3/2002
EP 1507107 A1 2/2005
EP 1593887 A 11/2005
FR 2259299 8/1975
FR 2651851 A 3/1991
FR 2866094 A1 8/2005
GB 1180047 A 2/1970
GB 2192255 A 1/1988
GB 2213894 A 8/1989
JP 58-057566 A 4/1983
JP 62-110094 5/1987
JP 1-238794 9/1989
JP 6-42682 2/1994

(56) References Cited

FOREIGN PATENT DOCUMENTS

| | | | |
|---|---|---|---|
| JP | 08145196 | A | 6/1996 |
| JP | 09-119529 | A | 5/1997 |
| JP | 2000-227164 | A | 8/2000 |
| JP | 2002-005311 | A | 1/2002 |
| JP | 2002323147 | A2 | 11/2002 |
| JP | 2003166654 | A2 | 6/2003 |
| JP | 2004 270769 | A | 9/2004 |
| JP | 2006-329430 | | 12/2006 |
| SU | 542884 | | 1/1977 |
| WO | 93/07410 | A1 | 4/1993 |
| WO | 94/18481 | A1 | 8/1994 |
| WO | 95/33942 | | 12/1995 |
| WO | 98/34058 | | 8/1998 |
| WO | 00/11381 | A1 | 3/2000 |
| WO | 2004/020881 | A1 | 3/2004 |
| WO | 2005/017397 | A2 | 2/2005 |
| WO | 2005/114012 | A1 | 12/2005 |
| WO | 2007107500 | A | 9/2007 |
| WO | 2009/059057 | A1 | 5/2009 |
| WO | 2009/059059 | A1 | 5/2009 |

OTHER PUBLICATIONS

International Search Report for PCT/US2008/081871 dated Jan. 29, 2009.

PIPE COUPLING

CROSS-REFERENCE TO RELATED APPLICATION(S)

The present application is a divisional application of U.S. patent application Ser. No. 12/262,087, now U.S. Pat. No. 8,104,796, filed Oct. 30, 2008, entitled "Pipe Coupling" and having named inventors Yves Stefani and Roland Lucotte, which claims priority from U.S. Provisional Patent Application 60/984,003 filed Oct. 31, 2007, entitled "Pipe Coupling" and having named inventors Yves Stefani and Roland Lucotte, and further claims priority to French Application No. 07 07658 filed Oct. 31, 2007, entitled "Pipe Coupling" and having named inventors Yves Stefani and Roland Lucotte, the applications of which are incorporated by reference herein in their entirety.

FIELD OF THE DISCLOSURE

The present disclosure relates generally to pipe joints or pipe couplings.

BACKGROUND

Traditionally, seals are used to prevent fluids from flowing between joints of rigid components. In particular examples, seals can be installed between flanges to limit fluid flow out of containment regions, e.g., pipes. Resilient seals can be used in between flanges of pipes to seal the pipes and prevent the pipes from leaking. However, resilient seals are typically not corrosion resistant.

Accordingly, there exists a need for an improved seal for a pipe joint.

BRIEF DESCRIPTION OF THE DRAWINGS

The present disclosure may be better understood, and its numerous features and advantages made apparent to those skilled in the art by referencing the accompanying drawings.

DESCRIPTION OF THE PREFERRED EMBODIMENTS

In general, a pipe joint is disclosed and can include a first pipe having a flange and a second pipe having a flange. A first sleeve can be installed within the first pipe and a second sleeve can be installed within the second pipe. Moreover, an annular ring can be disposed between the flange of the first pipe and the flange of the second pipe. The annular ring is configured to engage the first sleeve and the second sleeve and create a sealing engagement between the annular ring, the first sleeve and the second sleeve when a compressive force is applied to the first sleeve, the second sleeve, or a combination thereof along a longitudinal axis of the pipe assembly.

In another embodiment, a seal assembly is disclosed and can include a first sleeve and a second sleeve. An annular ring can be installed between the first sleeve and the second sleeve. The annular ring and the first sleeve can include a first complementary engagement structure. Also, the annular ring and the second sleeve can include a second complementary engagement structure. The first complementary engagement structure is configured to establish a first seal interface within a pipe and the second complementary engagement structure is configured to establish a second seal interface within a pipe.

In yet another embodiment, a method of modifying a pipe assembly that has a first pipe with a flange and a second pipe with a flange is disclosed. The method can include disassembling the pipe assembly, installing a first sleeve within the first pipe, installing a second sleeve within the second pipe, and installing an annular ring between the flange of the first pipe and the flange of the second pipe. The annular ring engages an end of the first sleeve and an end of the second sleeve.

Figure 1:
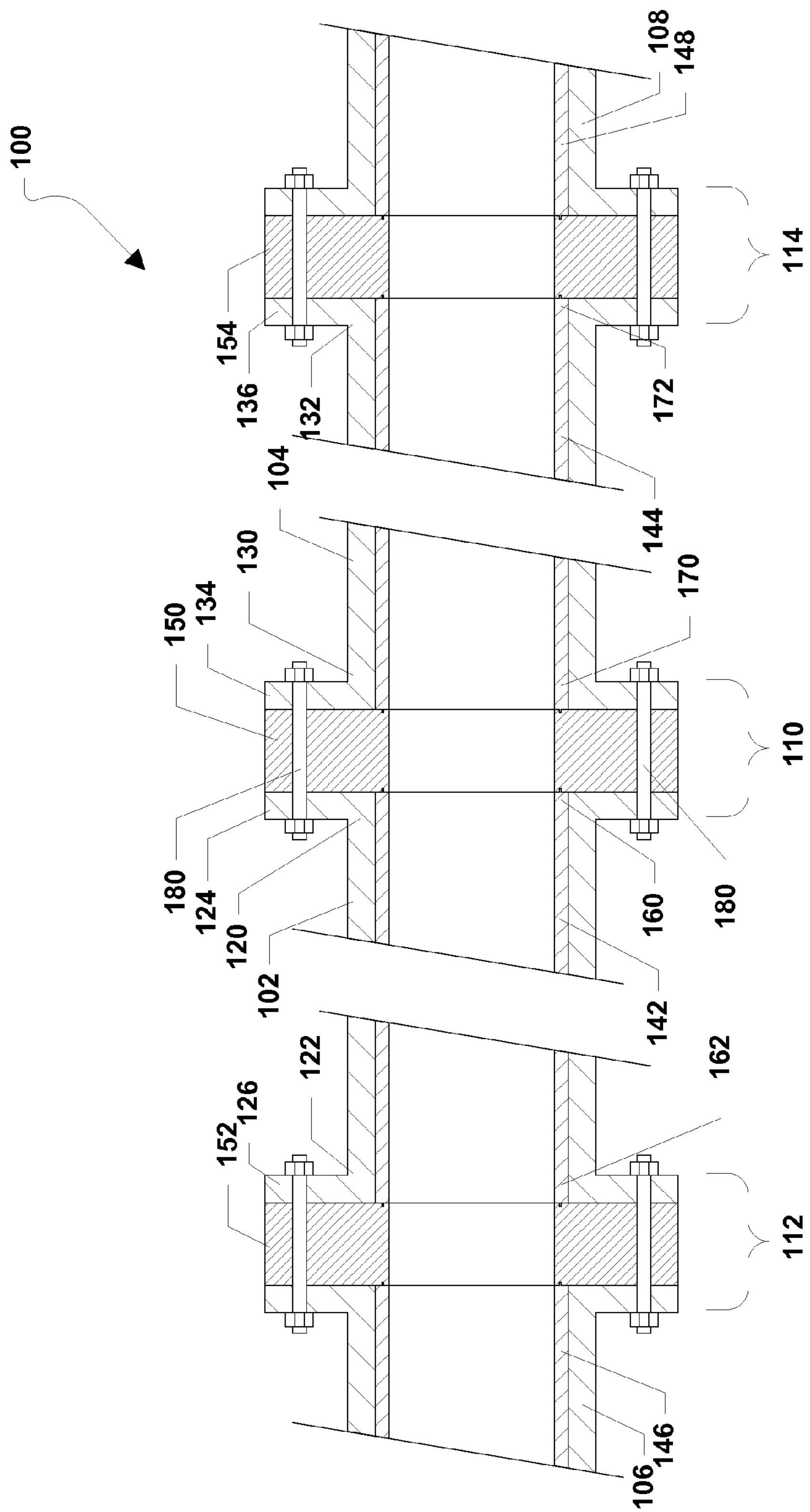
FIG. 1 is a cross-section view of a pipe system.

Referring to FIG. 1, pipe system is shown and is generally designated 100. As shown, the pipe system 100 can include a first pipe 102, a second pipe 104, a third pipe 106 and a fourth pipe 108. Further, the pipe system 100 can include a first pipe joint 110 between the first pipe 102 and the second pipe 104, a second pipe joint 112 between the first pipe 102 and the third pipe 106, and a third pipe joint 114 between the second pipe 104 and the fourth pipe 108.

As shown in FIG. 1, the first pipe 102 can include a first end 120 and a second end 122. A first pipe flange 124 can be formed on, or extend from, the first end 120 of the first pipe 102. A second pipe flange 126 can be formed on, or extend from, the second end 122 of the first pipe 102. The second pipe 104 can include a first end 130 and a second end 132. A first pipe flange 134 can be formed on, or extend from, the first end 130 of the second pipe 104. A second pipe flange 136 can be formed on, or extend from, the second end 132 of the second pipe 104.

FIG. 1 further shows that a first sleeve 142 can be disposed within the first pipe 102. A second sleeve 144 can be disposed within the second pipe 104. A third sleeve 146 can be disposed within the third pipe 106. Further, a fourth sleeve 148 can be disposed within the fourth pipe 108. A first annular ring 150 can be installed within the first pipe joint 110 between the first sleeve 142 and the second sleeve 144 and between the first pipe 102 and the second pipe 104. A second annular ring 152 can be installed within the second pipe joint 112 between the first sleeve and the third sleeve 146 and between the first pipe 102 and the third pipe 106. Additionally, a third annular ring 154 can be installed within the third pipe joint 114 between the second sleeve 144 and the fourth sleeve 148 and between the second pipe 104 and the third pipe 108.

As illustrated in FIG. 1, the first sleeve 142 can include a first end 160 and a second end 162. Also, the second sleeve 144 can include a first end 170 and a second end 172. Also, as shown in FIG. 1, the first pipe joint 110 can include a plurality of threaded fasteners 180 that can extend through the flanges 124, 134 of the pipes 102, 104 and the first annular ring 150. The threaded fasteners 180 can compress the first annular ring 150 between the first flange 124 of the first pipe 102 and the first flange 134 of the second pipe 104. In a particular embodiment, the second pipe joint 112 and the third pipe joint 114 are similarly constructed.

Figure 2:
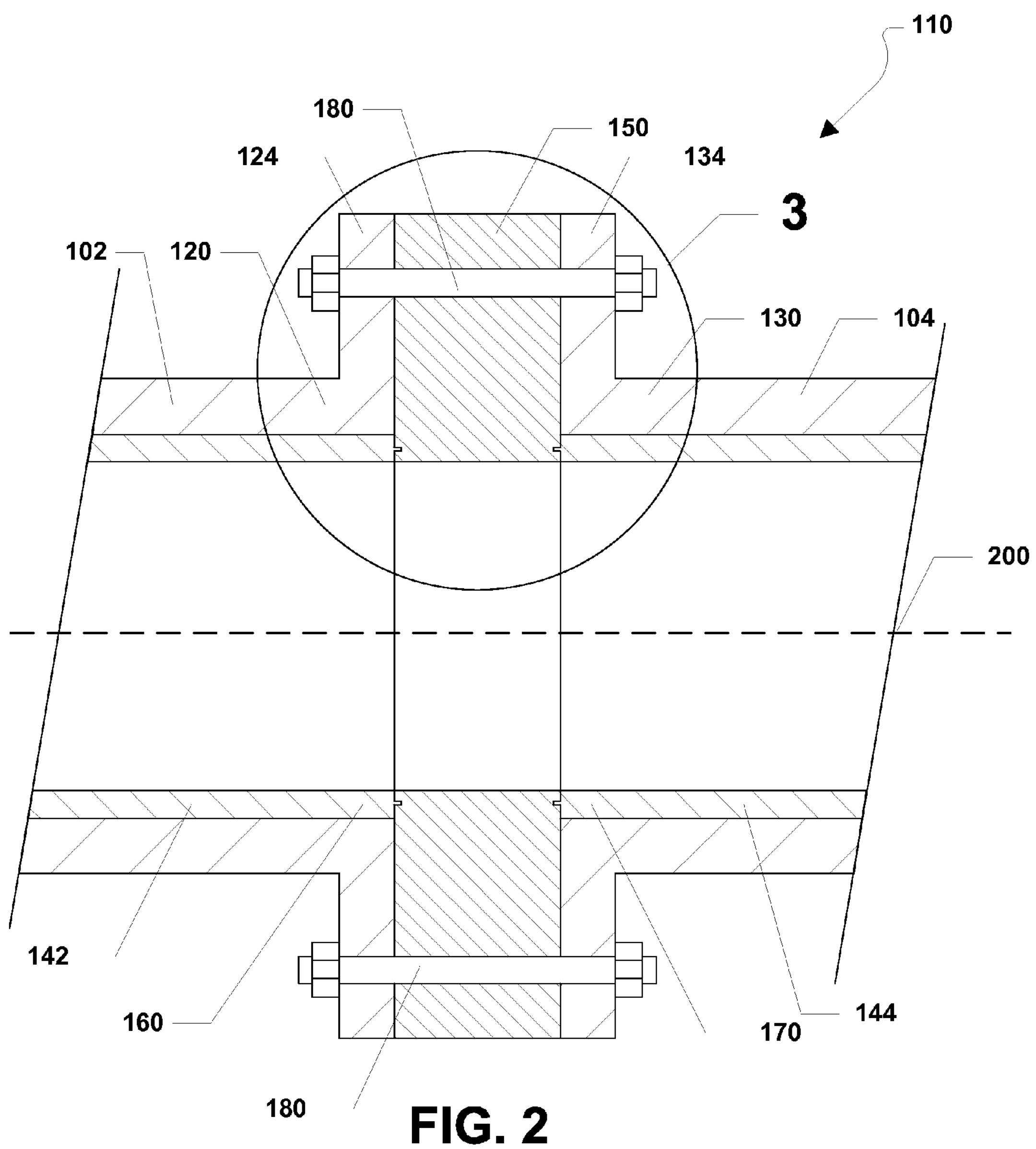
FIG. 2 is a cross-section view of a first embodiment of a pipe joint in the pipe system.

FIG. 2 illustrates additional details of the first pipe joint 110. It can be appreciated that the second pipe joint 112 and the third pipe joint 114 can be configured in a manner similar to the first pipe joint 110.

In general, as illustrated in FIG. 2, the first pipe joint 110 can include the first pipe flange 124 of the first pipe 102, and the first pipe flange 134 of the second pipe 104, the first end 160 of the first sleeve 142, the first end 170 of the second sleeve 144, the first annular ring 150, and the threaded fasteners 180.

Figure 3:
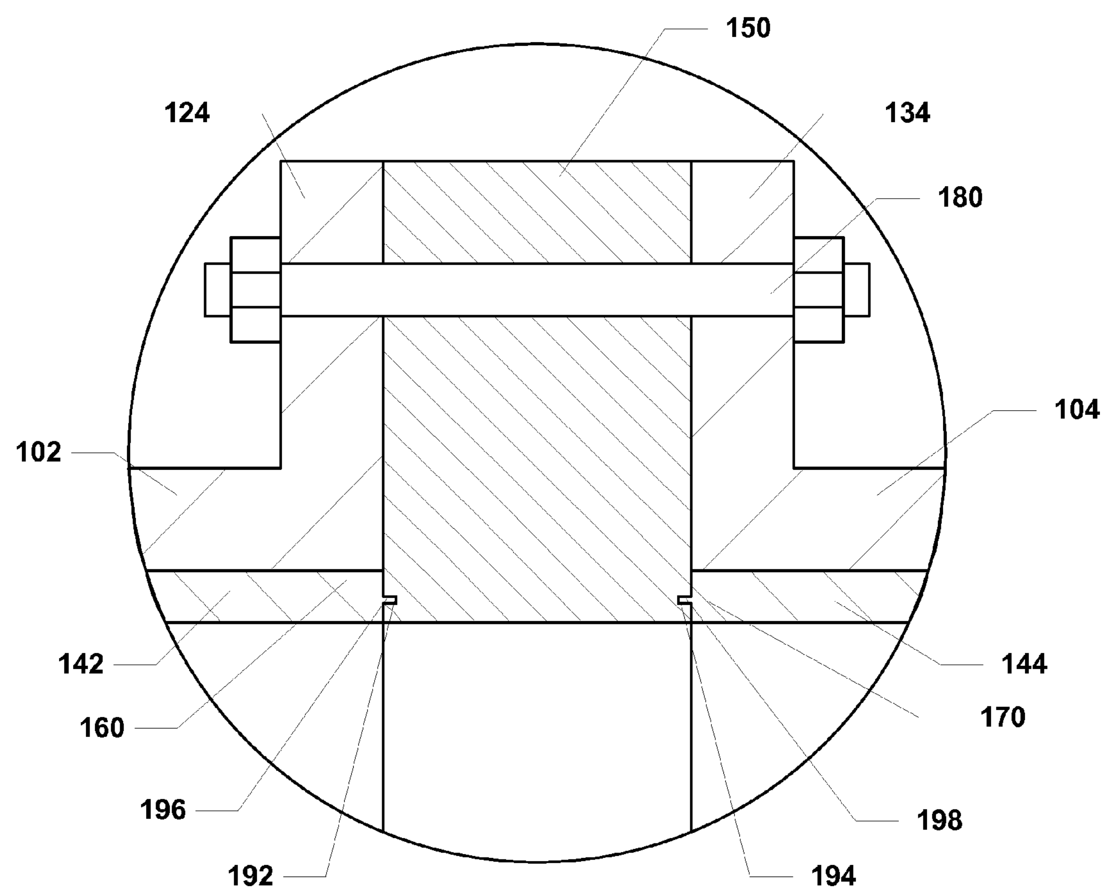
FIG. 3 is a detailed view of the pipe joint taken at circle 3 in FIG. 2.

FIG. 3 illustrates details concerning the first pipe joint 110. As indicated in FIG. 3, the first annular ring 150 can include a first sealing element 192 and a second sealing element 194. In a particular embodiment, the first sealing element 192 can be a groove formed in a first face of the first annular ring 150. The second sealing element 194 can be a groove formed in a second face of the first annular ring 150—opposite the first face. FIG. 3 also shows that the first end 160 of the first sleeve 142 can include a sealing element 196. Moreover, the first end 170 of the second sleeve 144 can include a sealing element 198. The sealing element 196 on the first end 160 of the first sleeve 142 can include a tongue that can extend from the face of the first end 160 of the first sleeve 142. The tongue can be configured to extend into and engage a groove, e.g., the first sealing element 192 of the first annular ring 150. Similarly, the sealing element 198 on the first end 170 of the second sleeve 144 can include a tongue that can extend from the face of the first end 170 of the second sleeve 144. The tongue can be configured to extend into and engage a groove, e.g., the second sealing element 194 of the first annular ring 150. As shown, the tongues and grooves can be generally rectangular.

As shown in FIG. 2 and FIG. 3, the sealing element 196 on the first end 160 of the first sleeve 142 can engage the first sealing element 192 of the first annular ring 150. Also, the sealing element 198 on the first end 170 of the second sleeve 144 can engage the second sealing element 194 of the first annular ring 150. A compressive force can be applied to the sleeves 142, 144 and the first annular ring 150 along a longitudinal axis 200 and the sealing elements 192, 194 of the first annular ring 150 can cooperate with the sealing elements 196, 198 of the sleeves 142, 144 to create a seal and prevent the pipes 102, 104 from leaking at the first pipe joint 110.

In a particular embodiment, the sealing element 196 on the first end 160 of the first sleeve 142 and the first sealing element 192 of the first annular ring 150 can form a first complementary engagement structure that is configured to provide a first seal interface within the first pipe joint 110 when the sleeves 142, 144 and the annular ring 150 are compressed. The sealing element 198 on the first end 170 of the second sleeve 144 and the second sealing element 194 of the first annular ring 150 can form a second complementary engagement structure that is configured to provide a second seal interface within the first pipe joint 110 when the sleeves 142, 144 and the annular ring 150 are compressed.

In a particular embodiment, the seal provided by the engagement of the first annular ring 150 with the first sleeve 142 and the second sleeve 144 can provide a sealing pressure, or withstand a pressure, of at least ten (10) bars. In another embodiment, the seal provided by the engagement of the first annular ring 150 with the first sleeve 142 and the second sleeve 144 can provide a sealing pressure, or withstand a pressure, of at least fifteen (15) bars. In yet another embodiment, the seal provided by the engagement of the first annular ring 150 with the first sleeve 142 and the second sleeve 144 can provide a sealing pressure, or withstand a pressure, of at least twenty (20) bars. In still another embodiment, the seal provided by the engagement of the first annular ring 150 with the first sleeve 142 and the second sleeve 144 can provide a sealing pressure, or withstand a pressure, of at least twenty-five (25) bars. In yet still another embodiment, the seal provided by the engagement of the first annular ring 150 with the first sleeve 142 and the second sleeve 144 may not provide a sealing pressure, or withstand a pressure, greater than thirty (30) bars.

In a particular embodiment, the first sleeve 142, the second sleeve 144, and the first annular ring 150 can be made from a substantially rigid corrosion resistant polymer. The corrosion resistant polymer can be a fluoropolymer. An exemplary fluoropolymer includes a polymer formed from a fluorine substituted olefin monomer or a polymer including at least one monomer selected from the group consisting of vinylidene fluoride, vinylfluoride, tetrafluoroethylene, hexafluoropropylene, trifluoroethylene, chlorotrifluoroethylene, or a mixture of such fluorinated monomers.

An exemplary fluoropolymer may include a polymer, a polymer blend or a copolymer including one or more of the above monomers, such as, for example, fluorinated ethylene propylene (FEP), ethylene-tetrafluoroethylene (ETFE), poly tetrafluoroethylene-perfluoropropylvinylether (PFA), poly tetrafluoroethylene-perfluoromethylvinylether (MFA), polytetrafluoroethylene (PTFE), polyvinylidene fluoride (PVDF), ethylene chlorotrifluoroethylene (ECTFE), polychlorotrifluoroethylene (PCTFE), or tetrafluoroethylene-hexafluoropropylene-vinylidene fluoride (THV).

In particular, the fluoropolymer may be polytetrafluoroethylene (PTFE), such as a modified PTFE. In an example, the modified PTFE is a copolymer of ethylene-tetrafluoroethylene and a vinyl ether, such as perfluoropropylvinylether (PPVE). In an embodiment, the modified PTFE includes at least about 0.01 wt % perfluoropropylvinylether (PPVE). In another example, the modified PTFE includes not greater than about 5.0 wt % PPVE, such as not greater than about 3.0 wt % or not greater than about 1.5 wt % PPVE. While particular embodiments of modified PTFE that include PPVE are melt processable, a particularly useful modified PTFE includes a small amount of PPVE such that the modified PTFE is not melt processable and instead is typically solution deposited and sintered. Particular examples of modified PTFE are commercially available, such as TFM 1700 available from Dyneon, Teflon® NXT available from DuPont®, and M1-11 available from Daikon.

Figure 4:
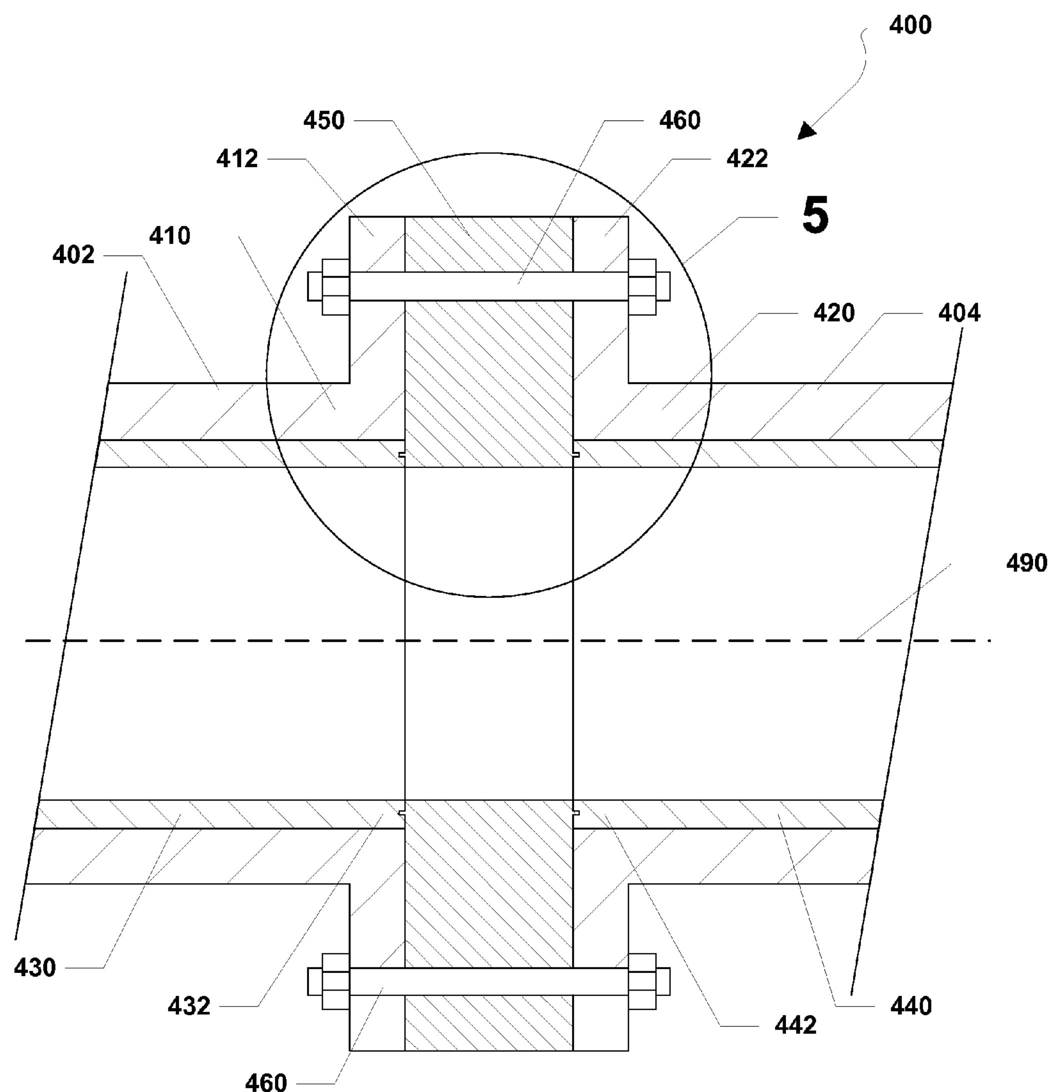
FIG. 4 is a cross-section view of a second embodiment of a pipe joint.
Figure 5:
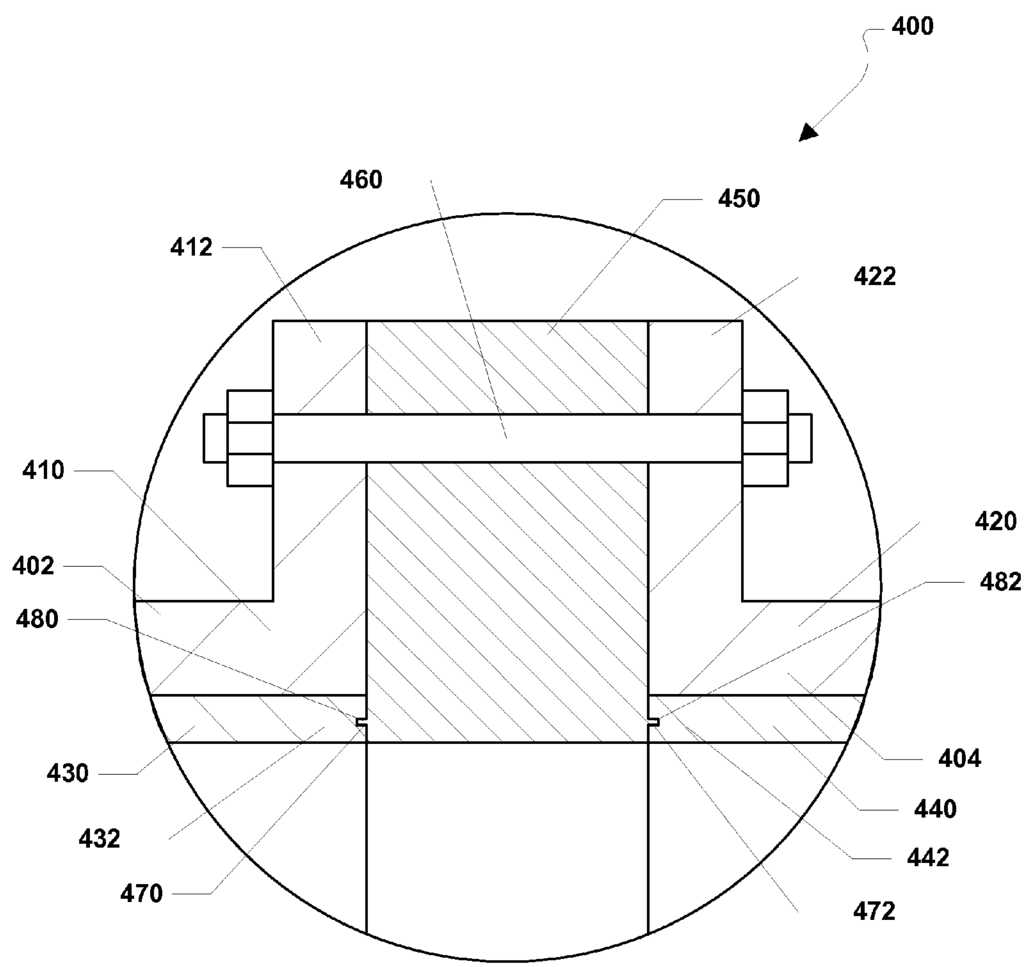
FIG. 5 is a detailed view of the second embodiment of the pipe joint taken at circle 5 in FIG. 4.

Referring now to FIG. 4 and FIG. 5, a second embodiment of a pipe joint is shown and is generally designated 400. As shown in FIG. 4 and FIG. 5, the pipe joint 400 can include a first pipe 402 and a second pipe 404. The first pipe 402 can include an end 410 and a flange 412 can be formed on, or extend from, the end 410 of the first pipe 402. The second pipe 404 can include an end 420 and a flange 422 can be formed on, or extend from, the end 420 of the second pipe 404.

FIG. 4 and FIG. 5 further shows that a first sleeve 430 can be disposed within the first pipe 402. The first sleeve 430 can include an end 432. A second sleeve 440 can be disposed within the second pipe 404. The second sleeve 440 can include an end 442. Further, as illustrated in FIG. 4 and FIG. 5, an annular ring 450 can be installed within the pipe joint 400 between the first sleeve 430 and the second sleeve 440 and between the first pipe 402 and the second pipe 404. Specifically, the annular ring 450 can be sandwiched between the flange 412 of the first pipe 402 and the flange 422 of the second pipe 404. The pipe joint 400 can also include a plurality of threaded fasteners 460 the flanges 412, 422 of the pipes 402, 404 and the annular ring 450. The threaded fasteners 460 can compress the annular ring 450 between the flanges 412, 422.

FIG. 5 depicts additional details of the pipe joint 400. As shown in FIG. 5, the annular ring 450 can include a first sealing element 470 and a second sealing element 472. In a particular embodiment, the first sealing element 470 can be a tongue that can extend substantially perpendicular from a first face of the annular ring 450. The second sealing element 472 can also be a tongue that can extend substantially perpendicular from a second face of the annular ring 450—opposite the first face.

FIG. 5 further shows that the end 432 of the first sleeve 430 can include a sealing element 480. Moreover, the end 442 of the second sleeve 440 can include a sealing element 482. The sealing element 480 on the end 432 of the first sleeve 430 can include a groove formed in the face of the end 432 of the first sleeve 430. The groove can be configured, i.e., sized and shaped, to receive and engage a tongue, e.g., the first sealing element 470 of the annular ring 450. Similarly, the sealing element 482 on the end 442 of the second sleeve 440 can include a groove formed in the face of the end 442 of the second sleeve 440. The groove can be configured, i.e., sized and shaped, to receive and engage a tongue, e.g., the second sealing element 472 of the annular ring 450.

As shown in FIG. 4 and FIG. 5, the sealing element 480 on the end 432 of the first sleeve 430 can engage the first sealing element 470 of the annular ring 450. Also, the sealing element 482 on the end 442 of the second sleeve 440 can engage the second sealing element 472 of the annular ring 450. A compressive force can be applied to the sleeves 430, 440 and the annular ring 450 along a longitudinal axis 490 and the sealing elements 470, 472 of the annular ring 450 can cooperate with the sealing elements 480, 482 of the sleeves 430, 440 to create a seal and prevent the pipes 402, 404 from leaking at the pipe joint 400.

In a particular embodiment, the sealing element 480 on the end 432 of the first sleeve 430 and the first sealing element 470 of the annular ring 450 can form a first complementary engagement structure that is configured to provide a first seal interface within the pipe joint 400 when the sleeves 430, 440 and the annular ring 450 are compressed. The sealing element 482 on the end 442 of the second sleeve 440 and the second sealing element 472 of the annular ring 450 can form a second complementary engagement structure that is configured to provide a second seal interface within the pipe joint 400 when the sleeves 430, 440 and the annular ring 450 are compressed.

Figure 6:
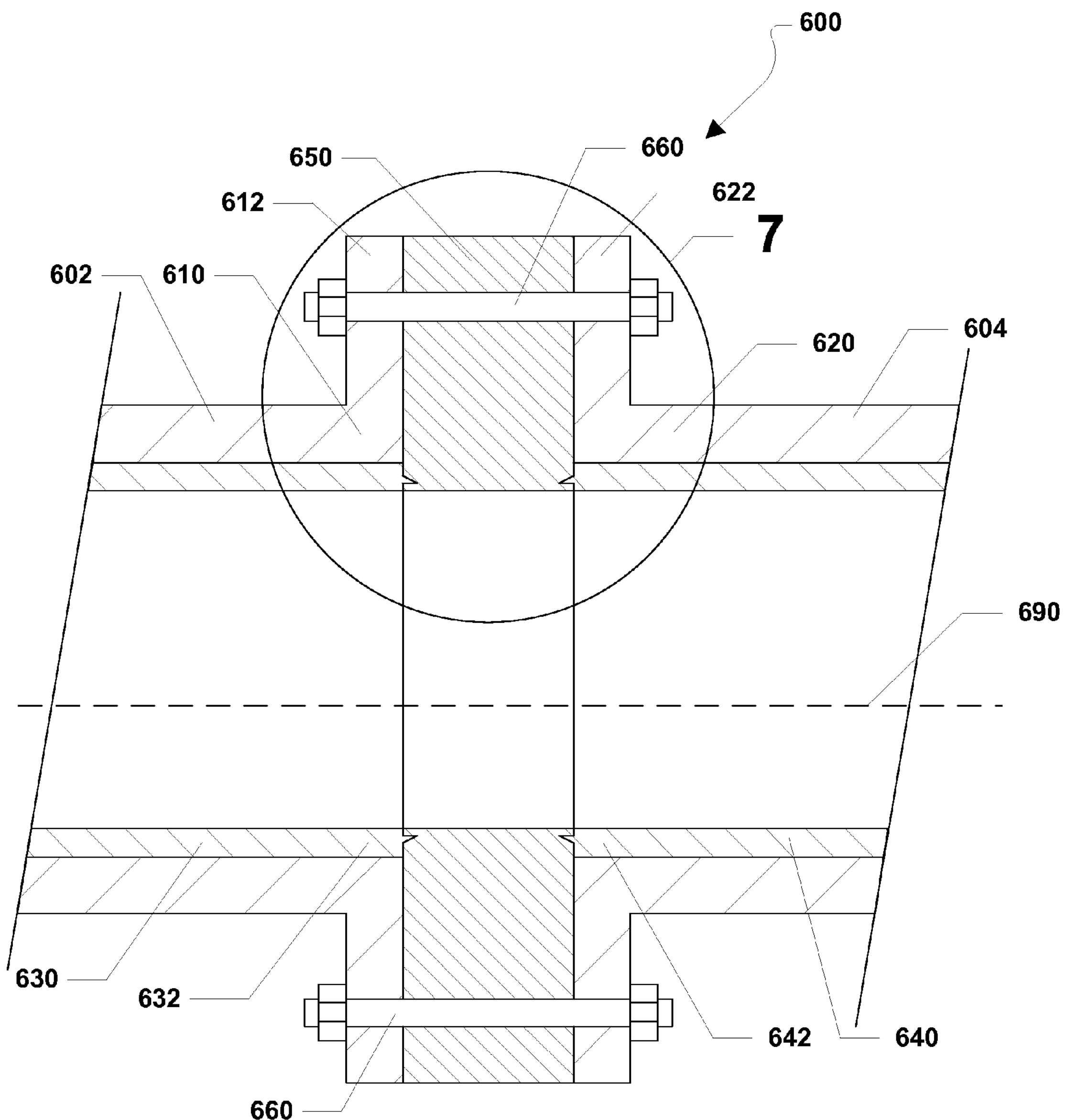
FIG. 6 is a cross-section view of a third embodiment of a pipe joint.
Figure 7:
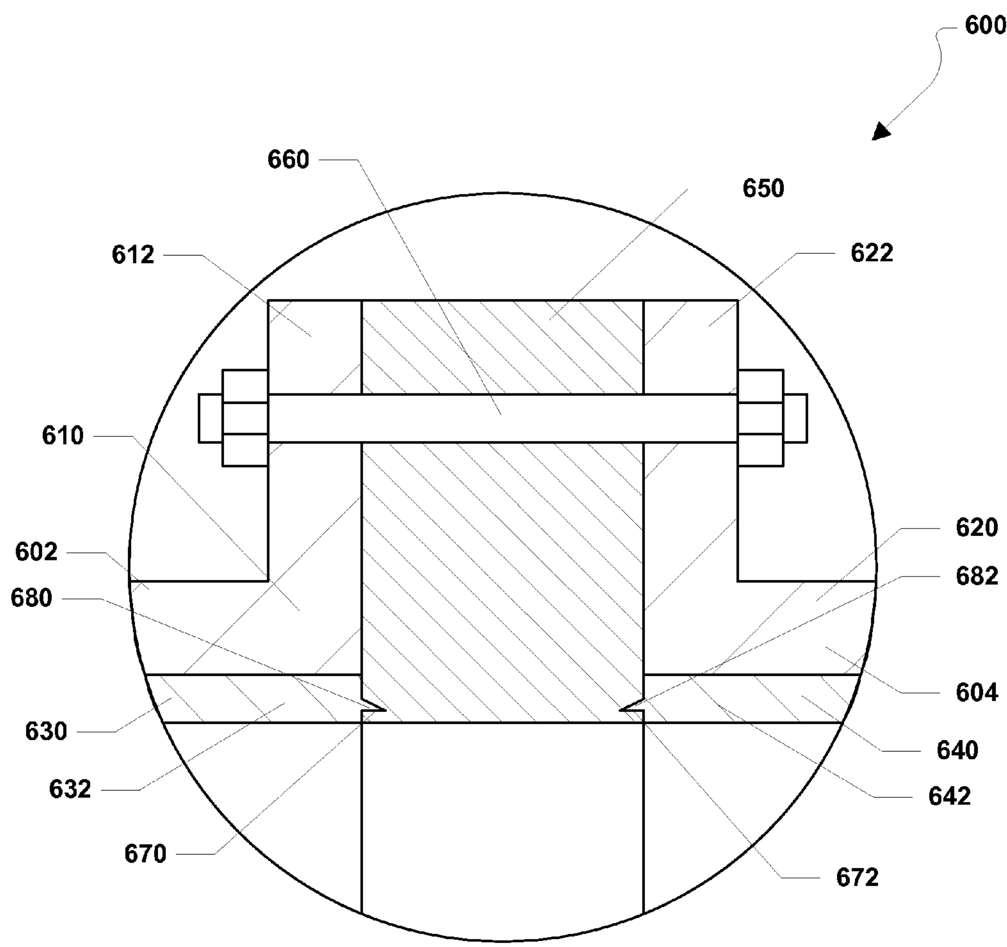
FIG. 7 is a detailed view of the third embodiment of the pipe joint taken at circle 7 in FIG. 6.

Referring now to FIG. 6 and FIG. 7, a third embodiment of a pipe joint is shown and is generally designated 600. As shown in FIG. 6 and FIG. 7, the pipe joint 600 can include a first pipe 602 and a second pipe 604. The first pipe 602 can include an end 610 and a flange 612 can be formed on, or extend from, the end 610 of the first pipe 602. The second pipe 604 can include an end 620 and a flange 622 can be formed on, or extend from, the end 620 of the second pipe 604.

FIG. 6 and FIG. 7 further shows that a first sleeve 630 can be disposed within the first pipe 602. The first sleeve 630 can include an end 632. A second sleeve 640 can be disposed within the second pipe 604. The second sleeve 640 can include an end 642. Further, as illustrated in FIG. 6 and FIG. 7, an annular ring 650 can be installed within the pipe joint 600 between the first sleeve 630 and the second sleeve 640 and between the first pipe 602 and the second pipe 604. Specifically, the annular ring 650 can be sandwiched between the flange 612 of the first pipe 602 and the flange 622 of the second pipe 604. The pipe joint 600 can also include a plurality of threaded fasteners 660 the flanges 612, 622 of the pipes 602, 604 and the annular ring 650. The threaded fasteners 660 can compress the annular ring 650 between the flanges 612, 622.

FIG. 7 depicts additional details of the pipe joint 600. As shown in FIG. 7, the annular ring 650 can include a first sealing element 670 and a second sealing element 672. In a particular embodiment, the first sealing element 670 can be a wedge-shaped groove that can extend into a first face of the annular ring 650. The second sealing element 672 can also be a wedge-shaped groove that can extend into a second face of the annular ring 650—opposite the first face.

FIG. 7 further shows that the end 632 of the first sleeve 630 can include a sealing element 680. Moreover, the end 642 of the second sleeve 640 can include a sealing element 682. The sealing element 680 on the end 632 of the first sleeve 630 can include a wedge-shaped tongue that can extend from the face of the end 632 of the first sleeve 630. The wedge-shaped tongue can be configured to extend into and engage a similarly shaped groove, e.g., the first sealing element 670 of the annular ring 650. Similarly, the sealing element 682 on the end 642 of the second sleeve 640 can include a wedge-shaped tongue that can extend from the face of the end 642 of the second sleeve 640. The wedge-shaped tongue can be configured to extend into and engage a similarly shaped groove, e.g., the second sealing element 672 of the annular ring 650.

As shown in FIG. 6 and FIG. 7, the sealing element 680 on the end 632 of the first sleeve 630 can engage the first sealing element 670 of the annular ring 650. Also, the sealing element 682 on the end 642 of the second sleeve 640 can engage the second sealing element 672 of the annular ring 650. A compressive force can be applied to the sleeves 630, 640 and the annular ring 650 along a longitudinal axis 690 and the sealing elements 670, 672 of the annular ring 650 can cooperate with the sealing elements 680, 682 of the sleeves 630, 640 to create a seal and prevent the pipes 602, 604 from leaking at the pipe joint 600.

In a particular embodiment, the sealing element 680 on the end 632 of the first sleeve 630 and the first sealing element 670 of the annular ring 650 can form a first complementary engagement structure that is configured to provide a first seal interface within the pipe joint 600 when the sleeves 630, 640 and the annular ring 650 are compressed. The sealing element 682 on the end 642 of the second sleeve 640 and the second sealing element 672 of the annular ring 650 can form a second complementary engagement structure that is configured to provide a second seal interface within the pipe joint 600 when the sleeves 630, 640 and the annular ring 650 are compressed.

Figure 8:
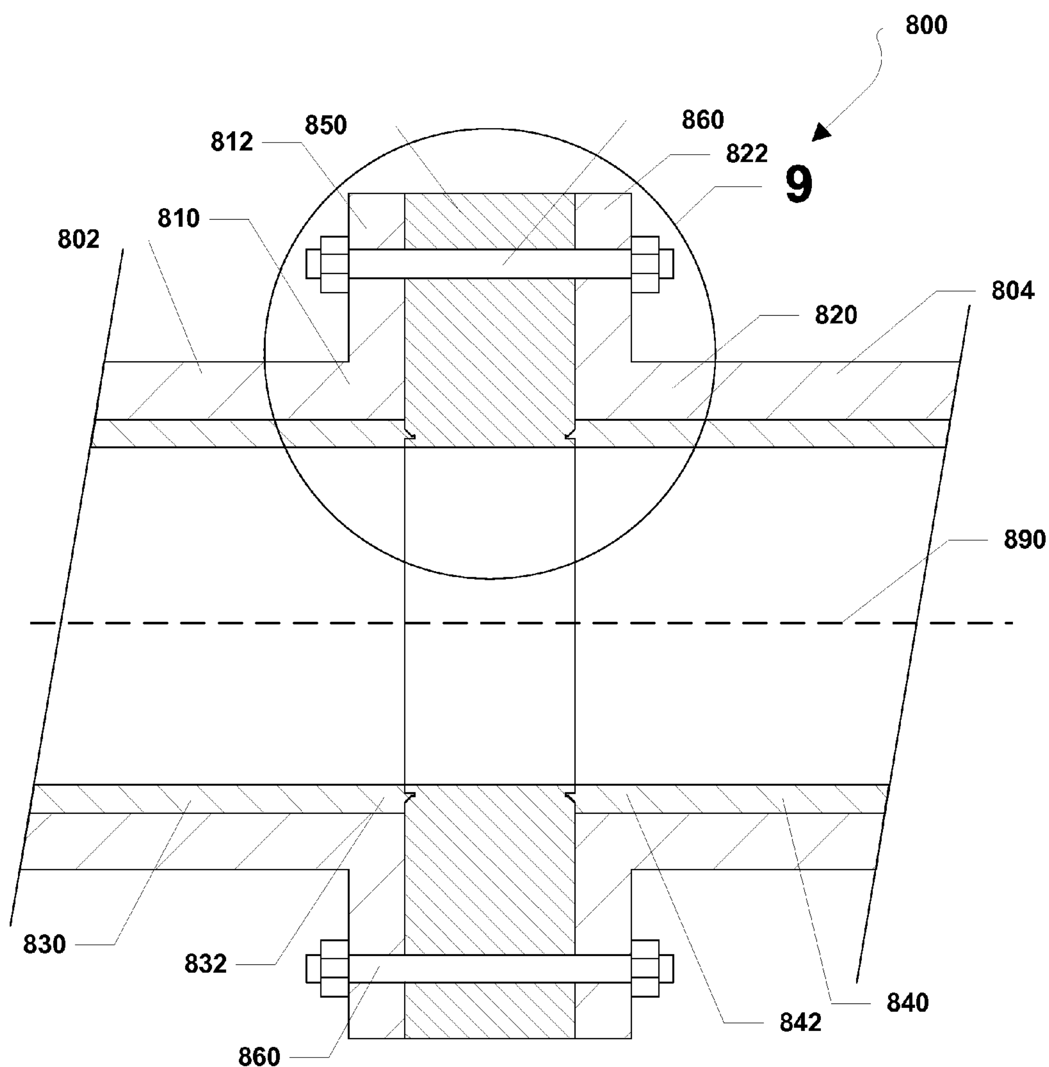
FIG. 8 is a cross-section view of a fourth embodiment of a pipe joint.
Figure 9:
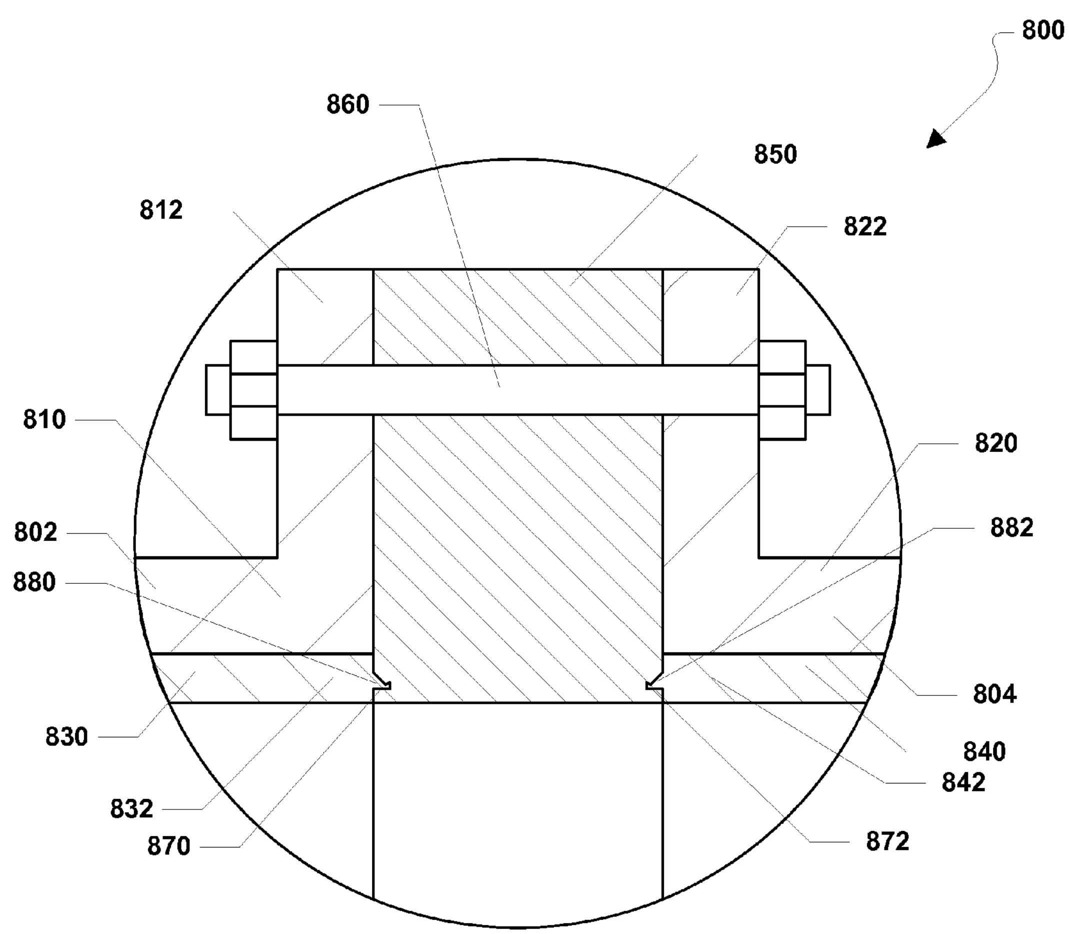
FIG. 9 is a detailed view of the fourth embodiment of the pipe joint taken at circle 9 in FIG. 8.

Referring now to FIG. 8 and FIG. 9, a fourth embodiment of a pipe joint is shown and is generally designated 800. As shown in FIG. 8 and FIG. 9, the pipe joint 800 can include a first pipe 802 and a second pipe 804. The first pipe 802 can include an end 810 and a flange 812 can be formed on, or extend from, the end 810 of the first pipe 802. The second pipe 804 can include an end 820 and a flange 822 can be formed on, or extend from, the end 820 of the second pipe 804.

FIG. 8 and FIG. 9 further shows that a first sleeve 830 can be disposed within the first pipe 802. The first sleeve 830 can include an end 832. A second sleeve 840 can be disposed within the second pipe 804. The second sleeve 840 can include an end 842. Further, as illustrated in FIG. 8 and FIG. 9, an annular ring 850 can be installed within the pipe joint 800 between the first sleeve 830 and the second sleeve 840 and between the first pipe 802 and the second pipe 804. Specifically, the annular ring 850 can be sandwiched between the flange 812 of the first pipe 802 and the flange 822 of the second pipe 804. The pipe joint 800 can also include a plurality of threaded fasteners 860 the flanges 812, 822 of the pipes 802, 804 and the annular ring 850. The threaded fasteners 860 can compress the annular ring 850 between the flanges 812, 822.

FIG. 9 depicts additional details of the pipe joint 800. As shown in FIG. 9, the annular ring 850 can include a first sealing element 870 and a second sealing element 872. In a particular embodiment, the first sealing element 870 can be a generally K-shaped groove that can extend into a first face of the annular ring 850. The second sealing element 872 can also be a generally K-shaped groove that can extend into a second face of the annular ring 850—opposite the first face.

FIG. 9 further shows that the end 832 of the first sleeve 830 can include a sealing element 880. Moreover, the end 842 of the second sleeve 840 can include a sealing element 882. The sealing element 880 on the end 832 of the first sleeve 830 can include a generally K-shaped tongue that can extend from face of the end 832 of the first sleeve 830. The K-shaped tongue can be configured to extend into and engage a similarly shaped groove, e.g., the first sealing element 870 of the annular ring 850. Similarly, the sealing element 882 on the end 842 of the second sleeve 840 can include a generally K-shaped tongue that can extend from the face of the end 842 of the second sleeve 840. The K-shaped tongue can be configured to extend into and engage a similarly shaped groove, e.g., the second sealing element 872 of the annular ring 850. In a particular embodiment, the K-shaped tongues can snap into the K-shaped grooves.

As shown in FIG. 8 and FIG. 9, the sealing element 880 on the end 832 of the first sleeve 830 can engage the first sealing element 870 of the annular ring 850. Also, the sealing element 882 on the end 842 of the second sleeve 840 can engage the second sealing element 872 of the annular ring 850. A compressive force can be applied to the sleeves 830, 840 and the annular ring 850 along a longitudinal axis 890 and the sealing elements 870, 872 of the annular ring 850 can cooperate with the sealing elements 880, 882 of the sleeves 830, 840 to create a seal and prevent the pipes 802, 804 from leaking at the pipe joint 800.

In a particular embodiment, the sealing element 880 on the end 832 of the first sleeve 830 and the first sealing element 870 of the annular ring 850 can form a first complementary engagement structure that is configured to provide a first seal interface within the pipe joint 800 when the sleeves 830, 840 and the annular ring 850 are compressed. The sealing element 882 on the end 842 of the second sleeve 840 and the second sealing element 872 of the annular ring 850 can form a second complementary engagement structure that is configured to provide a second seal interface within the pipe joint 800 when the sleeves 830, 840 and the annular ring 850 are compressed.

Figure 10:
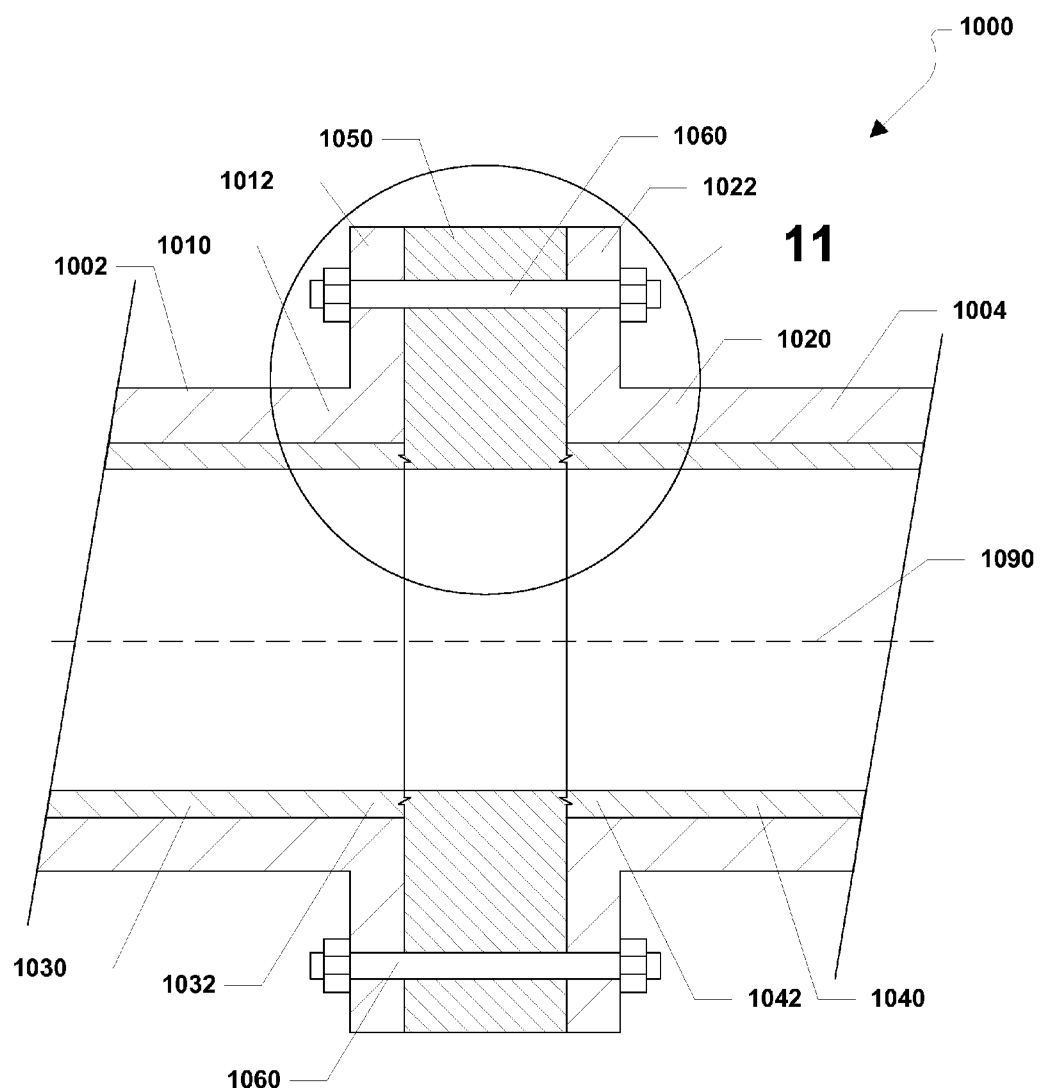
FIG. 10 is a cross-section view of a fifth embodiment of a pipe joint.
Figure 11:
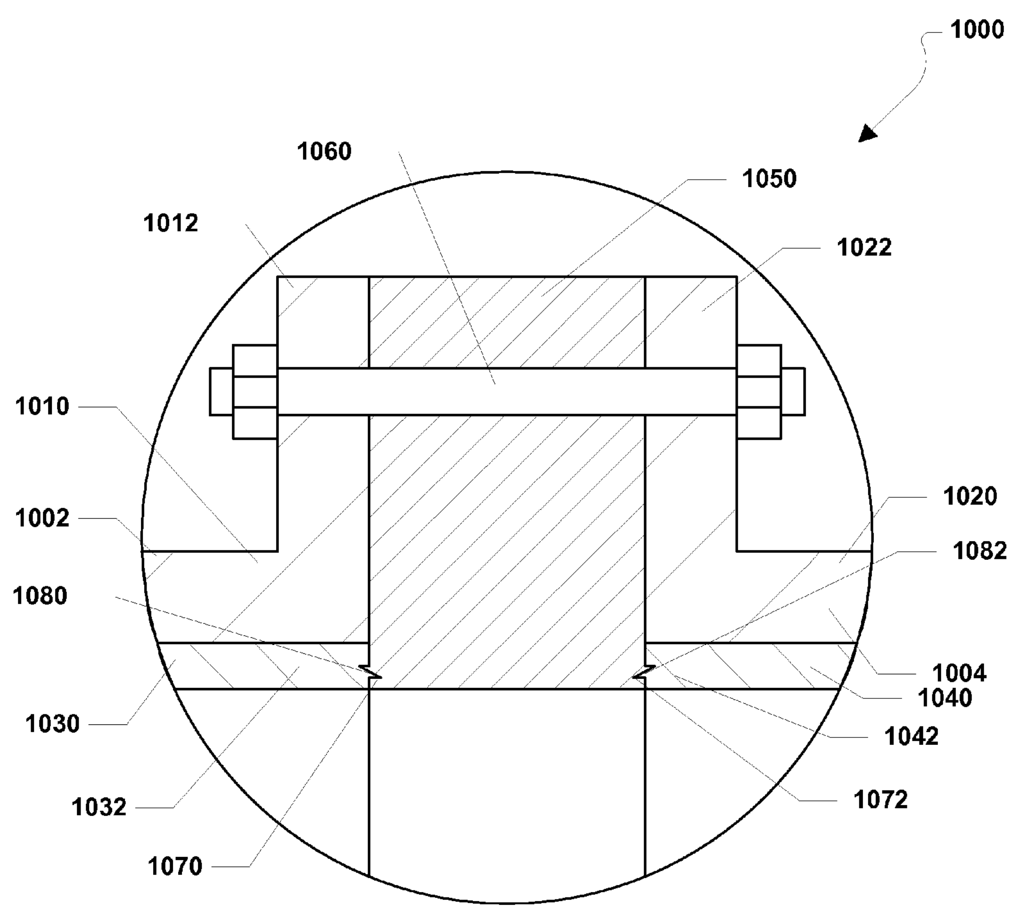
FIG. 11 is a detailed view of the fifth embodiment of the pipe joint taken at circle 11 in FIG. 10.

Referring now to FIG. 10 and FIG. 11, a fifth embodiment of a pipe joint is shown and is generally designated 1000. As shown in FIG. 10 and FIG. 11, the pipe joint 1000 can include a first pipe 1002 and a second pipe 1004. The first pipe 1002 can include an end 1010 and a flange 1012 can be formed on, or extend from, the end 1010 of the first pipe 1002. The second pipe 1004 can include an end 1020 and a flange 1022 can be formed on, or extend from, the end 1020 of the second pipe 1004.

FIG. 10 and FIG. 11 further shows that a first sleeve 1030 can be disposed within the first pipe 1002. The first sleeve 1030 can include an end 1032. A second sleeve 1040 can be disposed within the second pipe 1004. The second sleeve 1040 can include an end 1042. Further, as illustrated in FIG. 10 and FIG. 11, an annular ring 1050 can be installed within the pipe joint 1000 between the first sleeve 1030 and the second sleeve 1040 and between the first pipe 1002 and the second pipe 1004. Specifically, the annular ring 1050 can be sandwiched between the flange 1012 of the first pipe 1002 and the flange 1022 of the second pipe 1004. The pipe joint 1000 can also include a plurality of threaded fasteners 1060 the flanges 1012, 1022 of the pipes 1002, 1004 and the annular ring 1050. The threaded fasteners 1060 can compress the annular ring 1050 between the flanges 1012, 1022.

FIG. 11 depicts additional details of the pipe joint 1000. As shown in FIG. 11, the annular ring 1050 can include a first sealing element 1070 and a second sealing element 1072. In a particular embodiment, the first sealing element 1070 can be formed in a first face of the annular ring 1050 and the first sealing element 1070 can include a generally wedge-shaped groove that is circumscribed by a generally wedge-shaped tongue. The second sealing element 1072 can be formed in a second face of the annular ring 1050, opposite the first face of the annular ring 1050, and the second sealing element 1072 can include a generally wedge-shaped groove that is circumscribed by a generally wedge-shaped tongue.

FIG. 11 further shows that the end 1032 of the first sleeve 1030 can include a sealing element 1080. Moreover, the end 1042 of the second sleeve 1040 can include a sealing element 1082. The sealing element 1080 on the end 1032 of the first sleeve 1030 can be a tongue/groove arrangement that is sized and shaped to fit into, and engage, an opposing tongue/groove arrangement, e.g., the first sealing element 1070 of the annular ring 1050. Accordingly, as shown in FIG. 11, the sealing element 1080 on the end 1032 of the first sleeve 1030 can be a generally wedge-shaped tongue that is circumscribed by a wedge-shaped groove.

As shown in FIG. 11, the sealing element 1082 on the end 1042 of the first sleeve 1040 can be a tongue/groove arrangement that is sized and shaped to fit into, and engage, an opposing tongue/groove arrangement, e.g., the second sealing element 1072 of the annular ring 1050. Accordingly, the sealing element 1082 on the end 1042 of the second sleeve 1040 can be a generally wedge-shaped tongue that is circumscribed by a wedge-shaped groove.

As shown in FIG. 10 and FIG. 11, the sealing element 1080 on the end 1032 of the first sleeve 1030 can engage the first sealing element 1070 of the annular ring 1050. Also, the sealing element 1082 on the end 1042 of the second sleeve 1040 can engage the second sealing element 1072 of the annular ring 1050. A compressive force can be applied to the sleeves 1030, 1040 and the annular ring 1050 along a longitudinal axis 1090 and the sealing elements 1070, 1072 of the annular ring 1050 can cooperate with the sealing elements 1080, 1082 of the sleeves 1030, 1040 to create a seal and prevent the pipes 1002, 1004 from leaking at the pipe joint 1000.

In a particular embodiment, the sealing element 1080 on the end 1032 of the first sleeve 1030 and the first sealing element 1070 of the annular ring 1050 can form a first complementary engagement structure that is configured to provide a first seal interface within the pipe joint 1000 when the sleeves 1030, 1040 and the annular ring 1050 are compressed. The sealing element 1082 on the end 1042 of the second sleeve 1040 and the second sealing element 1072 of the annular ring 1050 can form a second complementary engagement structure that is configured to provide a second seal interface within the pipe joint 1000 when the sleeves 1030, 1040 and the annular ring 1050 are compressed.

Figure 12:
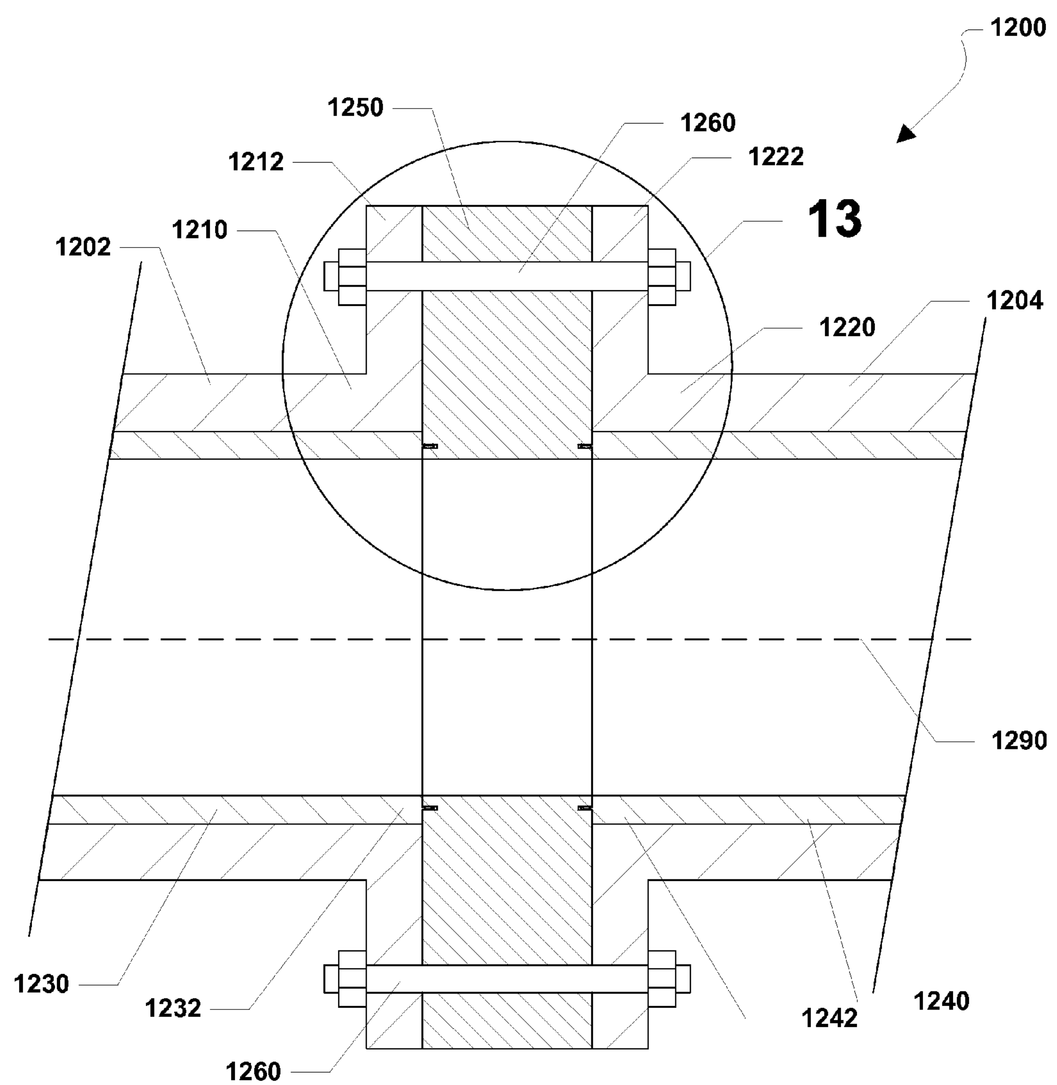
FIG. 12 is a cross-section view of a sixth embodiment of a pipe joint.
Figure 13A:
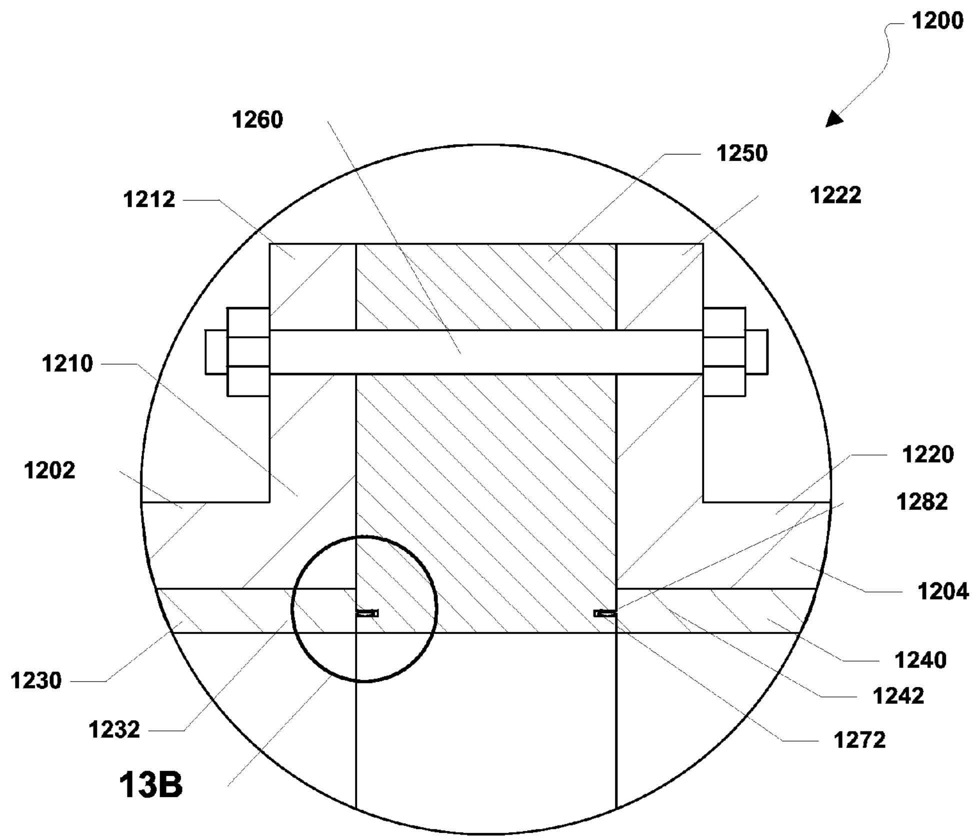
FIG. 13A is a detailed view of the sixth embodiment of the pipe joint taken at circle 13 in FIG. 12.
Figure 13B:
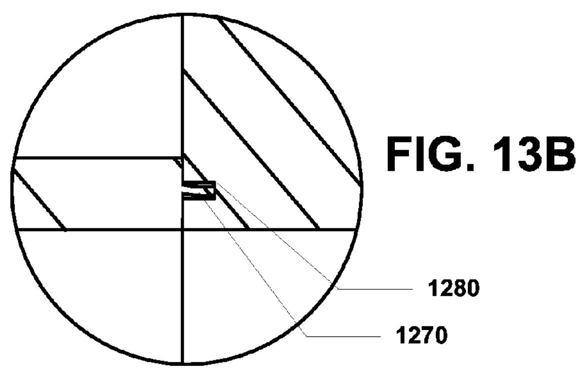
FIG. 13B is further enlarged view of the sixth embodiment of the pipe joint taken at circle 13B In FIG. 13A.

Referring now to FIG. 12 and FIG. 13, a sixth embodiment of a pipe joint is shown and is generally designated 1200. As shown in FIG. 12 and FIG. 13, the pipe joint 1200 can include a first pipe 1202 and a second pipe 1204. The first pipe 1202 can include an end 1210 and a flange 1212 can be formed on, or extend from, the end 1210 of the first pipe 1202. The second pipe 1204 can include an end 1220 and a flange 1222 can be formed on, or extend from, the end 1220 of the second pipe 1204.

FIG. 12 and FIG. 13 further shows that a first sleeve 1230 can be disposed within the first pipe 1202. The first sleeve 1230 can include an end 1232. A second sleeve 1240 can be disposed within the second pipe 1204. The second sleeve 1240 can include an end 1242. Further, as illustrated in FIG. 12 and FIG. 13, an annular ring 1250 can be installed within the pipe joint 1200 between the first sleeve 1230 and the second sleeve 1240 and between the first pipe 1202 and the second pipe 1204. Specifically, the annular ring 1250 can be sandwiched between the flange 1212 of the first pipe 1202 and the flange 1222 of the second pipe 1204. The pipe joint 1200 can also include a plurality of threaded fasteners 1260 the flanges 1212, 1222 of the pipes 1202, 1204 and the annular ring 1250. The threaded fasteners 1260 can compress the annular ring 1250 between the flanges 1212, 1222.

FIG. 13 depicts additional details of the pipe joint 1200. As shown in FIG. 13, the annular ring 1250 can include a first sealing element 1270 and a second sealing element 1272. In a particular embodiment, the first sealing element 1270 can be a groove that can extend substantially perpendicular into a first face of the annular ring 1250. The second sealing element 1272 can also be a groove that can extend substantially perpendicular from a second face of the annular ring 1250—opposite the first face.

FIG. 13 further shows that the end 1232 of the first sleeve 1230 can include a sealing element 1280. Moreover, the end 1242 of the second sleeve 1240 can include a sealing element 1282. The sealing element 1280 of the first sleeve 1230 can be a generally curved flange that can extend from the face of the end 1232 of the first sleeve 1230. As shown in FIG. 13, the sealing element 1280 on the first sleeve 1230 can be fitted into a groove, e.g., the first sealing element 1270 of the annular ring 1250. Further, the sealing element 1280 of the first sleeve 1230 can be slightly deformed, i.e., slightly flattened, by the first sealing element 1270 of the annular ring 1250 as the sealing element 1280 of the first sleeve 1230 is inserted into the first sealing element 1270 of the annular ring 1250.

The sealing element 1282 of the second sleeve 1240 can be a generally curved flange that can extend from the face of the end 1242 of the first sleeve 1240. As shown in FIG. 13, the sealing element 1282 on the second sleeve 1240 can be fitted into a groove, e.g., the second sealing element 1272 of the annular ring 1250. Further, the sealing element 1282 of the second sleeve 1240 can be slightly deformed, i.e., slightly flattened, by the second sealing element 1272 of the annular ring 1250 as the sealing element 1282 of the second sleeve 1240 is inserted into the second sealing element 1272 of the annular ring 1250.

As shown in FIG. 12 and FIG. 13, the sealing element 1280 on the end 1232 of the first sleeve 1230 can engage the first sealing element 1270 of the annular ring 1250. Also, the sealing element 1282 on the end 1242 of the second sleeve 1240 can engage the second sealing element 1272 of the annular ring 1250. A compressive force can be applied to the sleeves 1230, 1240 and the annular ring 1250 along a longitudinal axis 1290 and the sealing elements 1270, 1272 of the annular ring 1250 can cooperate with the sealing elements 1280, 1282 of the sleeves 1230, 1240 to create a seal and prevent the pipes 1202, 1204 from leaking at the pipe joint 1200.

Figure 14:
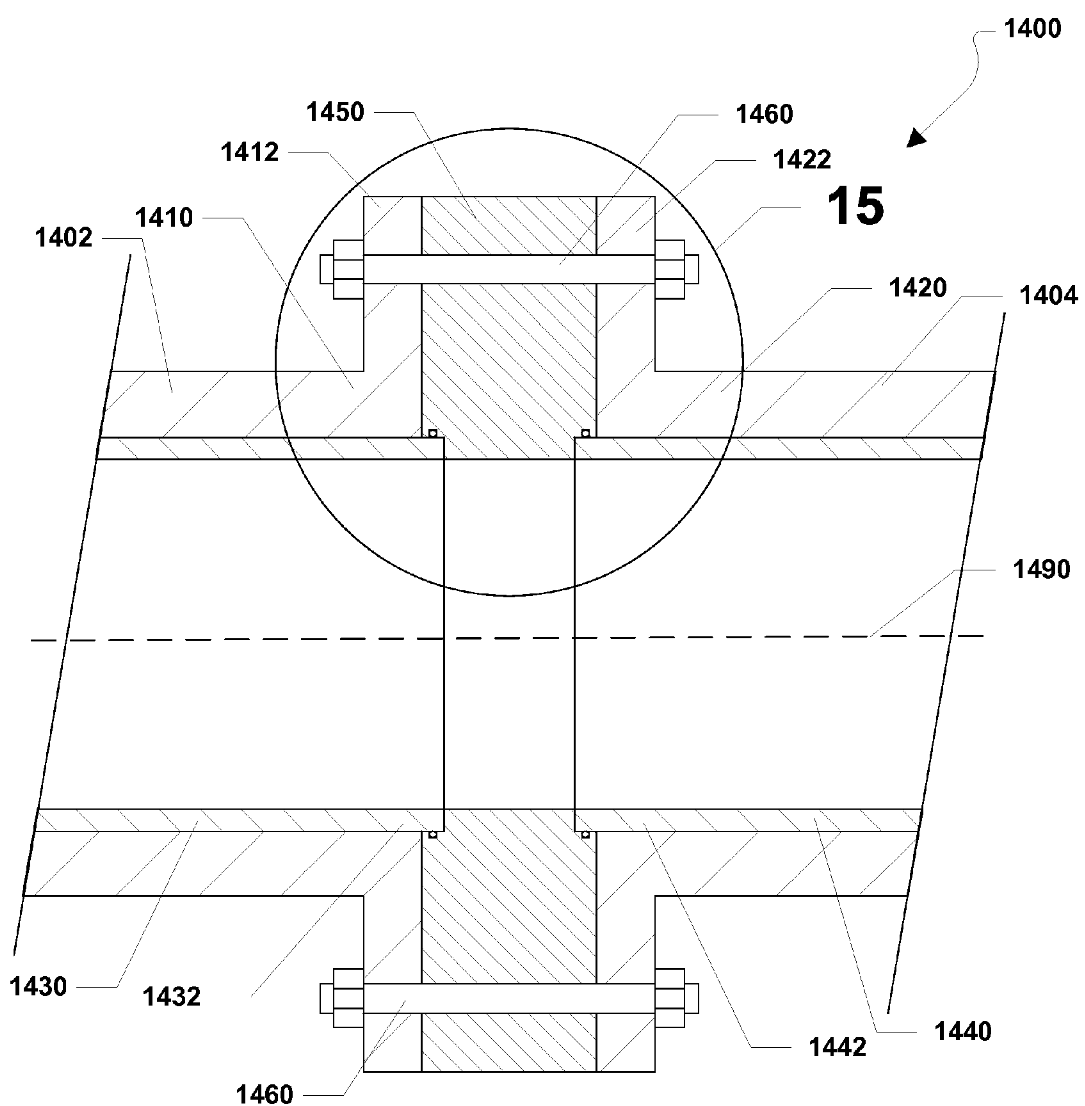
FIG. 14 is a cross-section view of a seventh embodiment of a pipe joint.
Figure 15:
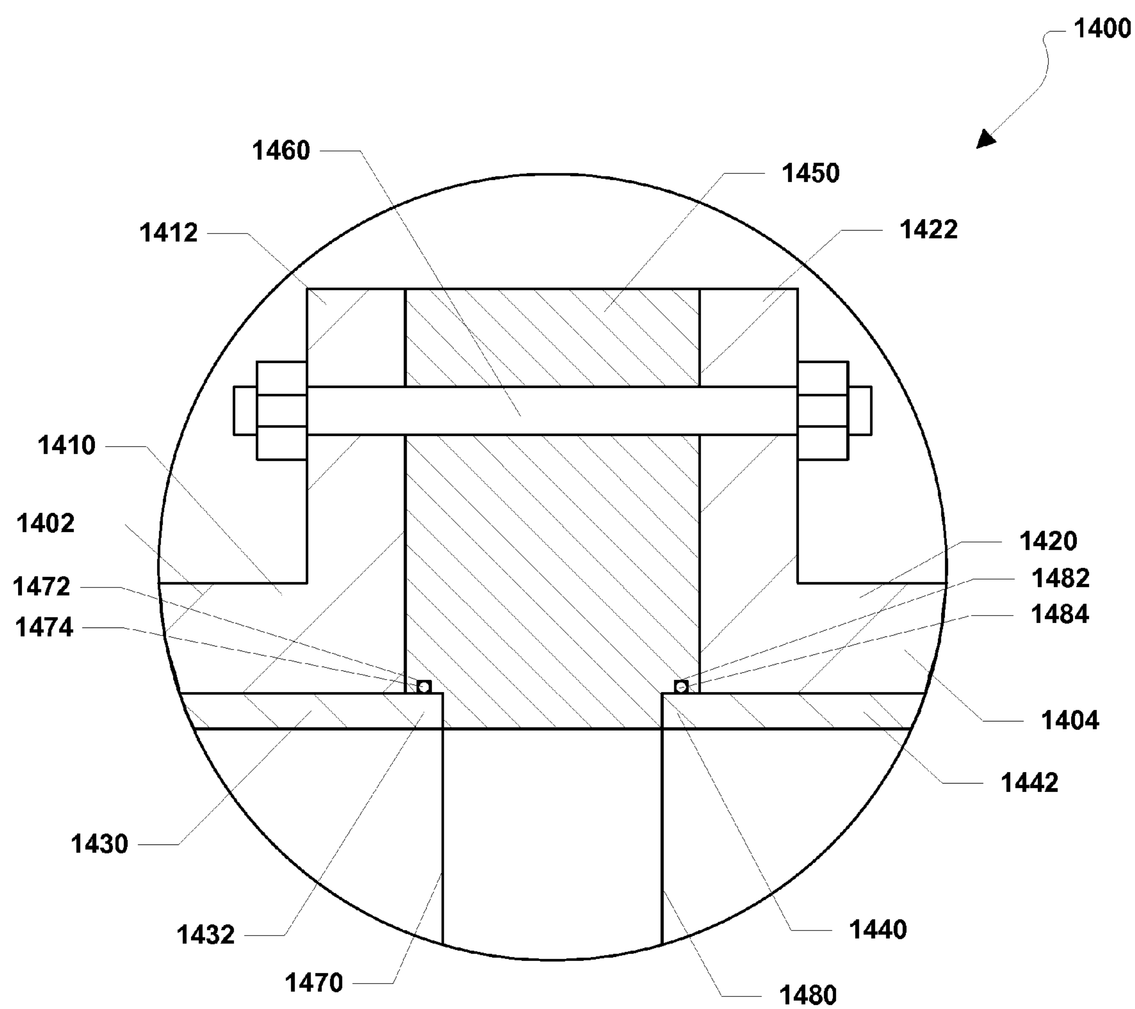
FIG. 15 is a detailed view of the seventh embodiment of the pipe joint taken at circle 15 in FIG. 14.

Referring now to FIG. 14 and FIG. 15, a seventh embodiment of a pipe joint is shown and is generally designated 1400. As shown in FIG. 14 and FIG. 15, the pipe joint 1400 can include a first pipe 1402 and a second pipe 1404. The first pipe 1402 can include an end 1410 and a flange 1412 can be formed on, or extend from, the end 1410 of the first pipe 1402. The second pipe 1404 can include an end 1420 and a flange 1422 can be formed on, or extend from, the end 1420 of the second pipe 1404.

FIG. 14 and FIG. 15 further shows that a first sleeve 1430 can be disposed within the first pipe 1402. The first sleeve 1430 can include an end 1432. A second sleeve 1440 can be disposed within the second pipe 1404. The second sleeve 1440 can include an end 1442. Further, as illustrated in FIG. 14 and FIG. 15, an annular ring 1450 can be installed within the pipe joint 1400 between the first sleeve 1430 and the second sleeve 1440 and between the first pipe 1402 and the second pipe 1404. Specifically, the annular ring 1450 can be sandwiched between the flange 1412 of the first pipe 1402 and the flange 1422 of the second pipe 1404. The pipe joint 1400 can also include a plurality of threaded fasteners 1460 the flanges 1412, 1422 of the pipes 1402, 1404 and the annular ring 1450. The threaded fasteners 1460 can compress the annular ring 1450 between the flanges 1412, 1422.

FIG. 15 depicts additional details of the pipe joint 1400. As shown in FIG. 15, the annular ring 1450 can include a first sleeve pocket 1470. A first O-ring groove 1472 can be formed in the annular ring 1450 around the first sleeve pocket 1470. Further, a first O-ring 1474 can be disposed within the first O-ring groove 1472. FIG. 15 shows, that the annular ring 1450 can also include a second sleeve pocket 1480. A second O-ring groove 1482 can be formed in the annular ring 1450 around the second sleeve pocket 1480. Also, a second O-ring 1484 can be disposed within the second O-ring groove 1482.

As depicted in FIG. 15, the end 1432 of the first sleeve 1430 can be fitted into the first pocket 1470 formed in the annular ring 1450. Further, the first O-ring 1474 can circumscribe the end 1432 of the first sleeve 1430. The first O-ring 1472 can also engage the end 1432 of the first sleeve 1430 and form a seal interface with the end 1432 of the first sleeve 1430.

FIG. 15 further shows that the end 1442 of the second sleeve 1440 can be fitted into the second pocket 1480 formed in the annular ring 1450. Further, the second O-ring 1484 can circumscribe the end 1442 of the second sleeve 1440. The second O-ring 1484 can also engage the end 1442 of the second sleeve 1440 and form a seal interface with the end 1442 of the second sleeve 1440.

Figure 16:
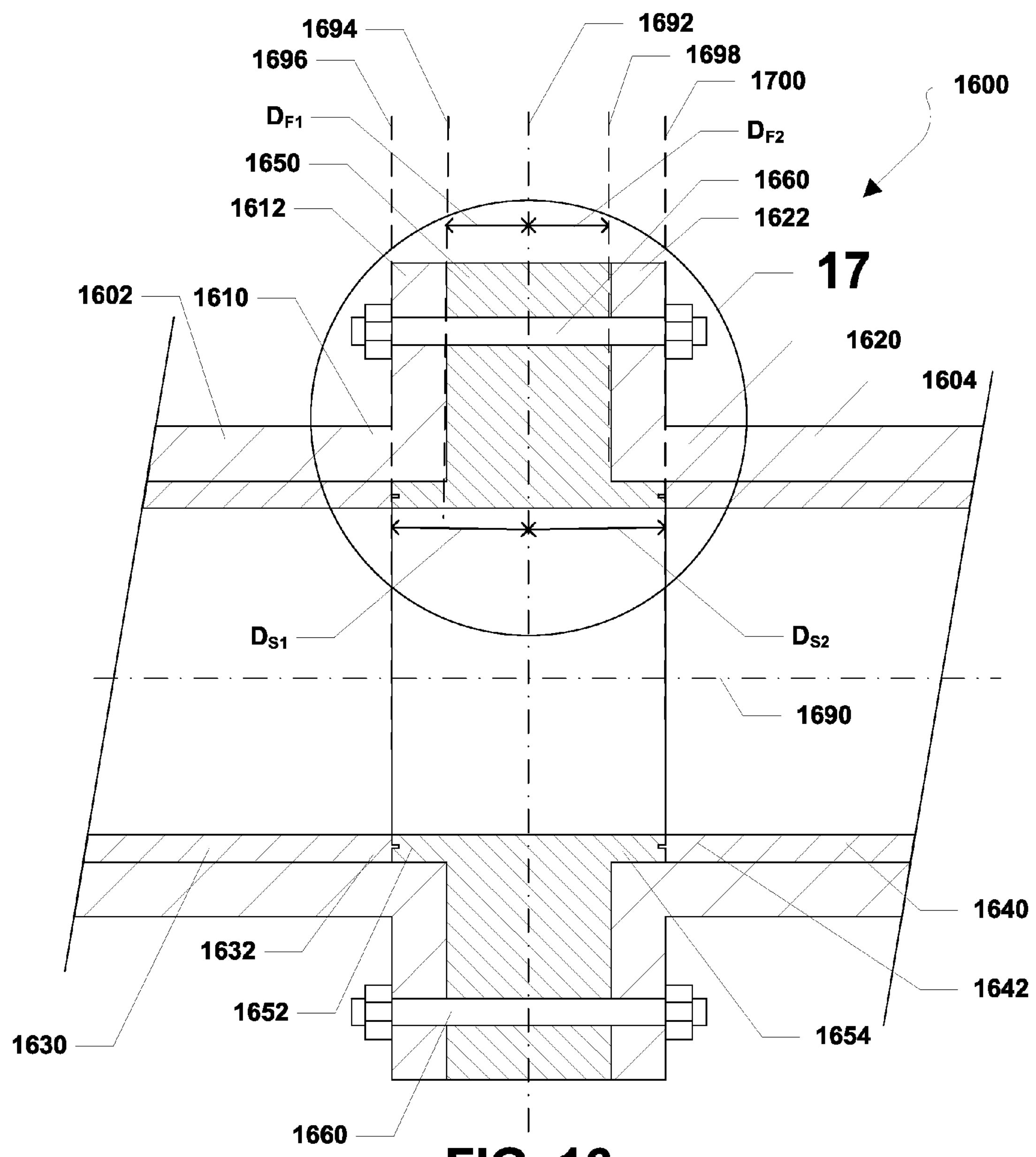
FIG. 16 is a cross-section view of a eighth embodiment of a pipe joint.
Figure 17:
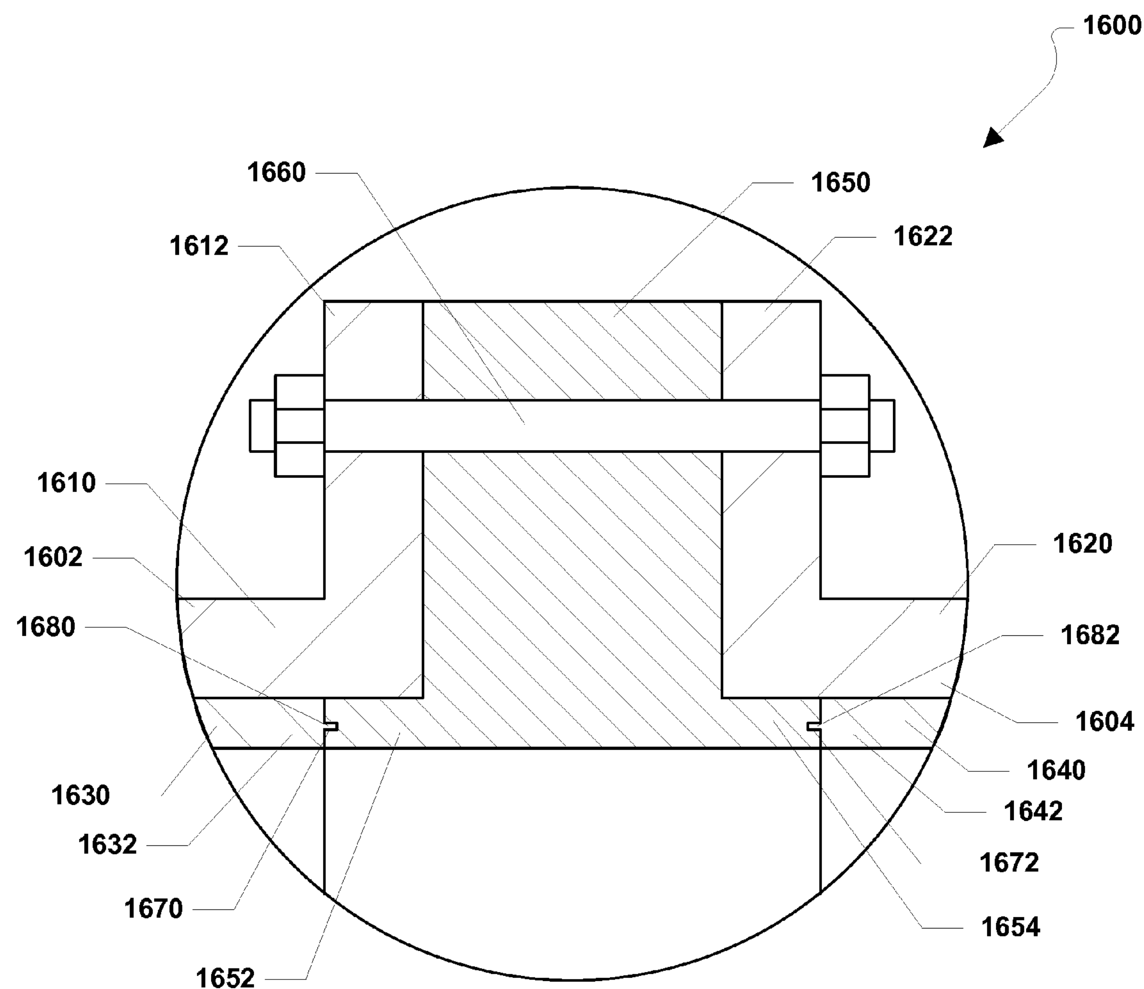
FIG. 17 is a detailed view of the eighth embodiment of the pipe joint taken at circle 17 in FIG. 16.

Referring now to FIG. 16 and FIG. 17, an eighth embodiment of a pipe joint is shown and is generally designated 1600. As shown in FIG. 16 and FIG. 17, the pipe joint 1600 can include a first pipe 1602 and a second pipe 1604. The first pipe 1602 can include an end 1610 and a flange 1612 can be formed on, or extend from, the end 1610 of the first pipe 1602. The second pipe 1604 can include an end 1620 and a flange 1622 can be formed on, or extend from, the end 1620 of the second pipe 1604.

FIG. 16 and FIG. 17 further shows that a first sleeve 1630 can be disposed within the first pipe 1602. The first sleeve 1630 can include an end 1632. A second sleeve 1640 can be disposed within the second pipe 1604. The second sleeve 1640 can include an end 1642. Further, as illustrated in FIG. 16 and FIG. 17, an annular ring 1650 can be installed within the pipe joint 1600 between the first sleeve 1630 and the second sleeve 1640 and between the first pipe 1602 and the second pipe 1604. Specifically, the annular ring 1650 can be sandwiched between the flange 1612 of the first pipe 1602 and the flange 1622 of the second pipe 1604.

As shown, the annular ring 1650 can include a first hub 1652 that can extend from annular ring 1650 into the first pipe 1602 and a second hub 1654 that can extend from the annular ring 1650 into the second pipe 1604—opposite the first hub 1652. The pipe joint 1600 can also include a plurality of threaded fasteners 1660 the flanges 1612, 1622 of the pipes 1602, 1604 and the annular ring 1650. The threaded fasteners 1660 can compress the annular ring 1650 between the flanges 1612, 1622.

FIG. 17 depicts additional details of the pipe joint 1600. As shown in FIG. 17, the annular ring 1650 can include a first sealing element 1670 and a second sealing element 1672. In a particular embodiment, the first sealing element 1670 can be a groove that can extend into a face of the first hub 1652 of the annular ring 1650. The second sealing element 1672 can also be a groove that can extend into a second face of the second hub 1654 of the annular ring 1650.

FIG. 17 further shows that the end 1632 of the first sleeve 1630 can include a sealing element 1680. Moreover, the end 1642 of the second sleeve 1640 can include a sealing element 1682. The sealing element 1680 on the end 1632 of the first sleeve 1630 can include a tongue that can extend from the face of the end 1632 of the first sleeve 1630. The tongue can be configured to extend into and engage a Groove, e.g., the first sealing element 1670 of the annular ring 1650. Similarly, the sealing element 1682 on the end 1642 of the second sleeve 1640 can include a tongue that can extend from the face of the end 1642 of the second sleeve 1640. The tongue can be configured to extend into and engage a groove, e.g., the second sealing element 1672 of the annular ring 1650.

As shown in FIG. 16 and FIG. 17, the sealing element 1680 on the end 1632 of the first sleeve 1630 can engage the first sealing element 1670 of the annular ring 1650. Also, the sealing element 1682 on the end 1642 of the second sleeve 1640 can engage the second sealing element 1672 of the annular ring 1650. A compressive force can be applied to the sleeves 1630, 1640 and the annular ring 1650 along a longitudinal axis 1690 and the sealing elements 1670, 1672 of the annular ring 1650 can cooperate with the sealing elements 1680, 1682 of the sleeves 1630, 1640 to create a seal and prevent the pipes 1602, 1604 from leaking at the pipe joint 1600.

As shown in FIG. 16, the pipe joint 1600 can include a central axis 1692 that can lie approximately along the midpoint of the annular ring 1650. A first flange interface 1694 can be established at a distance, $D_{F1}$, from the central axis 1690. Further, a first sleeve interface 1696 can be established at a distance, $D_{S1}$, from the central axis 1692. In a particular embodiment, $D_{S1}$ is equal to $1.25\times D_{F1}$. In another embodiment, $D_{S1}$ is equal to $1.5\times D_{F1}$. In yet another embodiment, $D_{S1}$ is equal to $1.75\times D_{F1}$. In another embodiment, $D_{S1}$ is equal to $2.0\times D_{F1}$. In still another embodiment, $D_{S1}$ is not greater than $3.0\times D_{F1}$.

FIG. 16 further indicates that a second flange interface 1698 can be established at a distance, $D_{F2}$, from the central axis 1692. Further, a second sleeve interface 1700 can be established at a distance, $D_{S2}$, from the central axis 1692. In a particular embodiment, $D_{S2}$ is equal to $1.25\times D_{F2}$. In another embodiment, $D_{S2}$ is equal to $1.5\times D_{F2}$. In yet another embodiment, $D_{S2}$ is equal to $1.75\times D_{F2}$. In another embodiment, $D_{S2}$ is equal to $2.0\times D_{F2}$. In still another embodiment, $D_{S2}$ is not greater than $3.0\times D_{F2}$.

In a particular embodiment, the sealing element 1680 on the end 1632 of the first sleeve 1630 and the first sealing element 1670 of the first hub 1652 of the annular ring 1650 can form a first complementary engagement structure that is configured to provide a first seal interface within the pipe joint 1600 when the sleeves 1630, 1640 and the annular ring 1650 are compressed. The sealing element 1682 on the end 1642 of the second sleeve 1640 and the second sealing element 1672 of the second hub 1654 of the annular ring 1650 can form a second complementary engagement structure that is configured to provide a second seal interface within the pipe joint 1600 when the sleeves 1630, 1640 and the annular ring 1650 are compressed.

Figure 18:
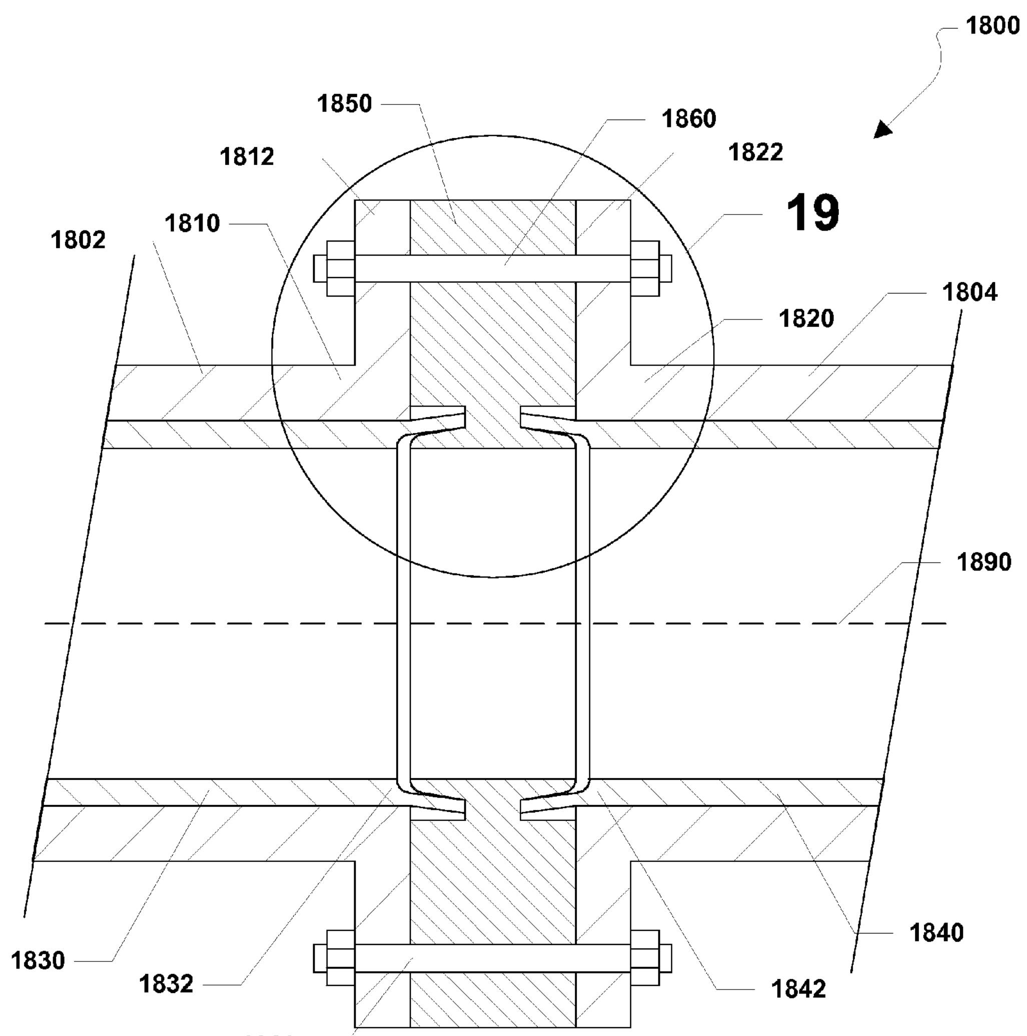
FIG. 18 is a cross-section view of a ninth embodiment of a pipe joint.
Figure 19:
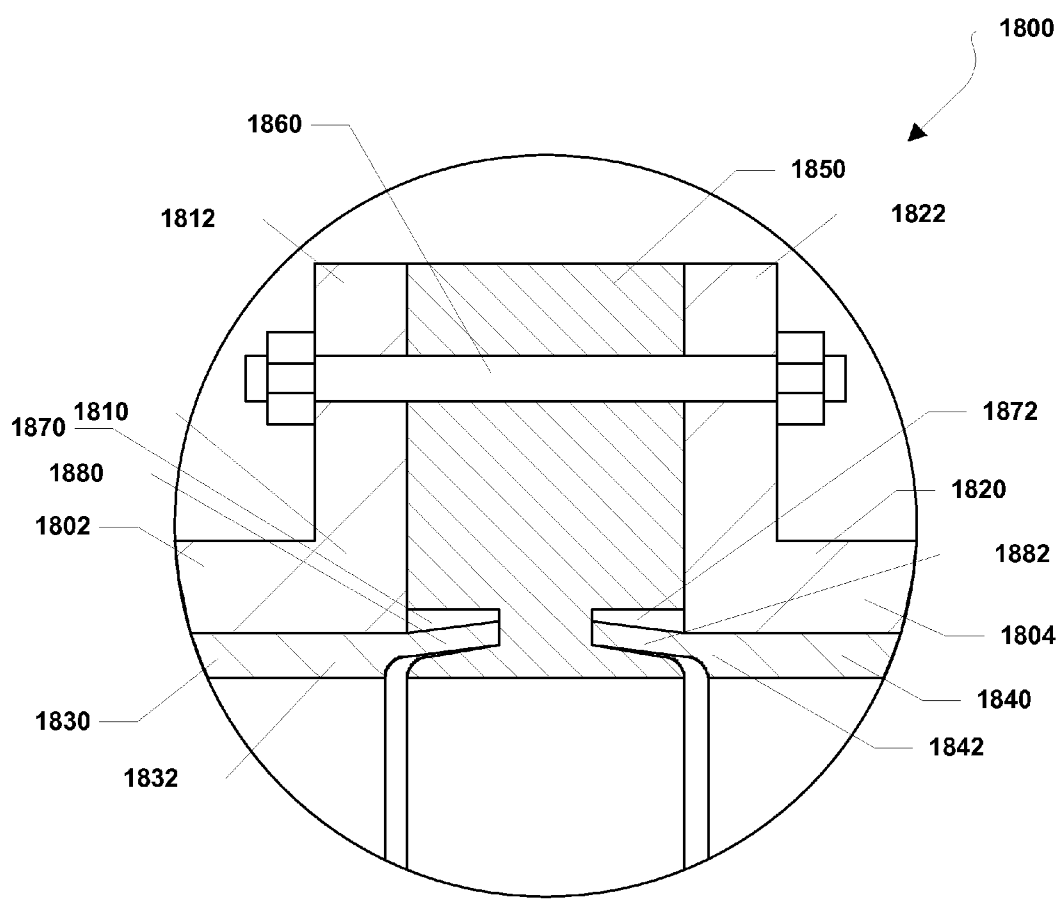
FIG. 19 is a detailed view of the ninth embodiment of the pipe joint taken at circle 19 in FIG. 18.

Referring now to FIG. 18 and FIG. 19, a ninth embodiment of a pipe joint is shown and is generally designated 1800. As shown in FIG. 18 and FIG. 19, the pipe joint 1800 can include a first pipe 1802 and a second pipe 1804. The first pipe 1802 can include an end 1810 and a flange 1812 can be formed on, or extend from, the end 1810 of the first pipe 1802. The second pipe 1804 can include an end 1820 and a flange 1822 can be formed on, or extend from, the end 1820 of the second pipe 1804.

FIG. 18 and FIG. 19 further shows that a first sleeve 1830 can be disposed within the first pipe 1802. The first sleeve 1830 can include an end 1832. A second sleeve 1840 can be disposed within the second pipe 1804. The second sleeve 1840 can include an end 1842. Further, as illustrated in FIG. 18 and FIG. 19, an annular ring 1850 can be installed within the pipe joint 1800 between the first sleeve 1830 and the second sleeve 1840 and between the first pipe 1802 and the second pipe 1804. Specifically, the annular ring 1850 can be sandwiched between the flange 1812 of the first pipe 1802 and the flange 1822 of the second pipe 1804. The pipe joint 1800 can also include a plurality of threaded fasteners 1860 the flanges 1812, 1822 of the pipes 1802, 1804 and the annular ring 1850. The threaded fasteners 1860 can compress the annular ring 1850 between the flanges 1812, 1822.

FIG. 19 depicts additional details of the pipe joint 1800. As shown in FIG. 19, the annular ring 1850 can include a first sealing element 1870 and a second sealing element 1872. In a particular embodiment, the first sealing element 1870 can be a flared sleeve pocket formed in a first face of the annular ring

1850. The second sealing element 1872 can also be a flared sleeve pocket formed in a second face of the annular ring 1850—opposite the first face.

FIG. 19 further shows that the end 1832 of the first sleeve 1830 can include a sealing element 1880. Moreover, the end 1842 of the second sleeve 1840 can include a sealing element 1882. The sealing element 1880 of the first sleeve 1830 can be a flared tube formed on the end 1832 of the first sleeve 1830. As shown in FIG. 19, the sealing element 1880 on the first sleeve 1830 can be fitted into a flared sleeve cavity, e.g., the first sealing element 1870 of the annular ring 1850. Further, the sealing element 1880 of the first sleeve 1830 can be flared, or deformed, radially outward by the first sealing element 1870 of the annular ring 1850 as the sealing element 1880 of the first sleeve 1830 is installed around the first sealing element 1870 of the annular ring 1850.

The sealing element 1882 of the second sleeve 1840 can be a flared sleeve formed on the end 1842 of the second sleeve 1840. As shown in FIG. 19, the sealing element 1882 on the second sleeve 1840 can be fitted into a flared sleeve pocket, e.g., the second sealing element 1872 of the annular ring 1850. Further, the sealing element 1882 of the second sleeve 1840 can be flared, or deformed, radially outward by the second sealing element 1872 of the annular ring 1850 as the sealing element 1882 of the second sleeve 1840 is installed around the second sealing element 1872 of the annular ring 1850.

As shown in FIG. 18 and FIG. 19, the sealing element 1880 on the end 1832 of the first sleeve 1830 can engage the first sealing element 1870 of the annular ring 1850. Also, the sealing element 1882 on the end 1842 of the second sleeve 1840 can engage the second sealing element 1872 of the annular ring 1850. A compressive force can be applied to the sleeves 1830, 1840 and the annular ring 1850 along a longitudinal axis 1890 and the sealing elements 1870, 1872 of the annular ring 1850 can cooperate with the sealing elements 1880, 1882 of the sleeves 1830, 1840 to create a seal and prevent the pipes 1802, 1804 from leaking at the pipe joint 1800.

Figure 20:
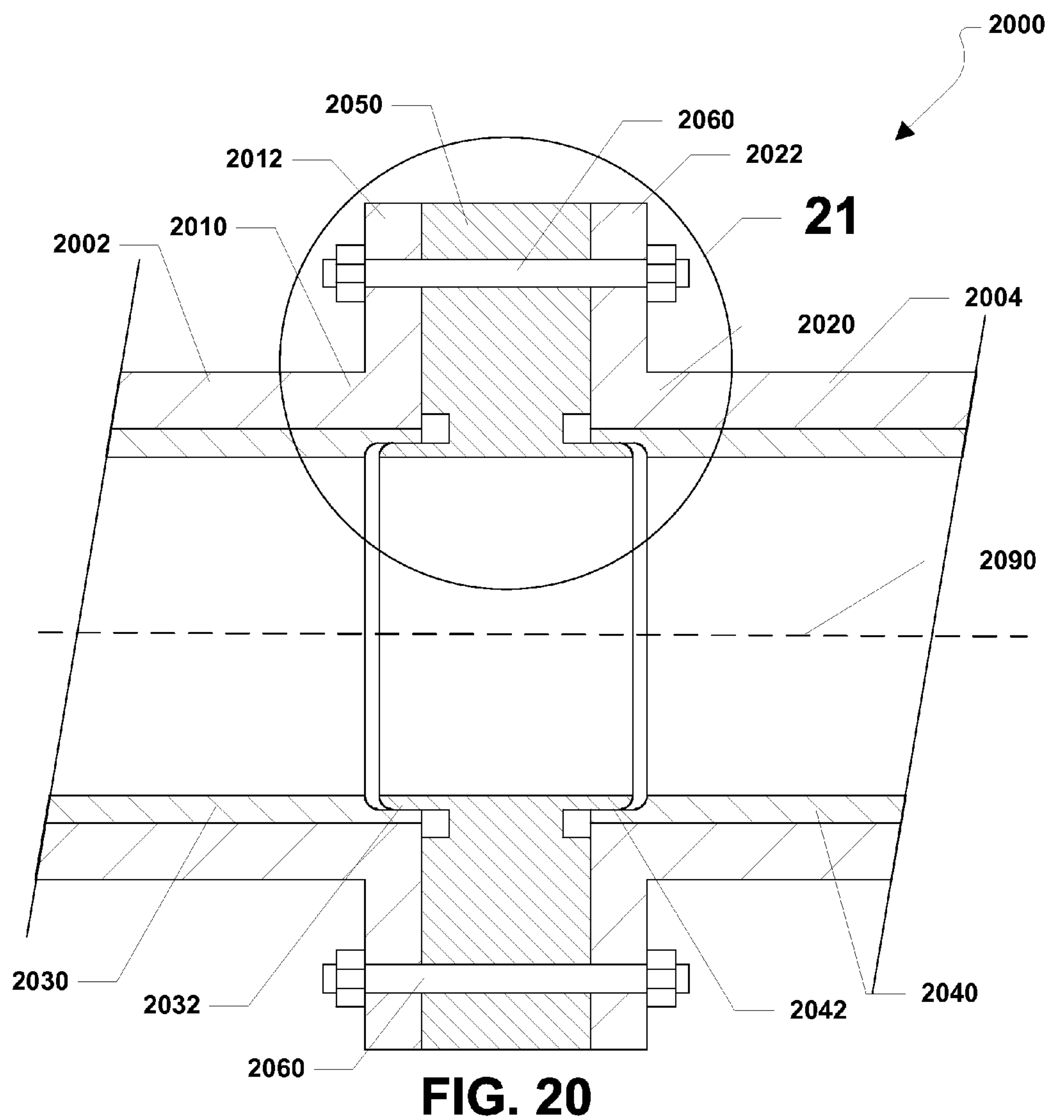
FIG. 20 is a cross-section view of a tenth embodiment of a pipe joint.
Figure 21:
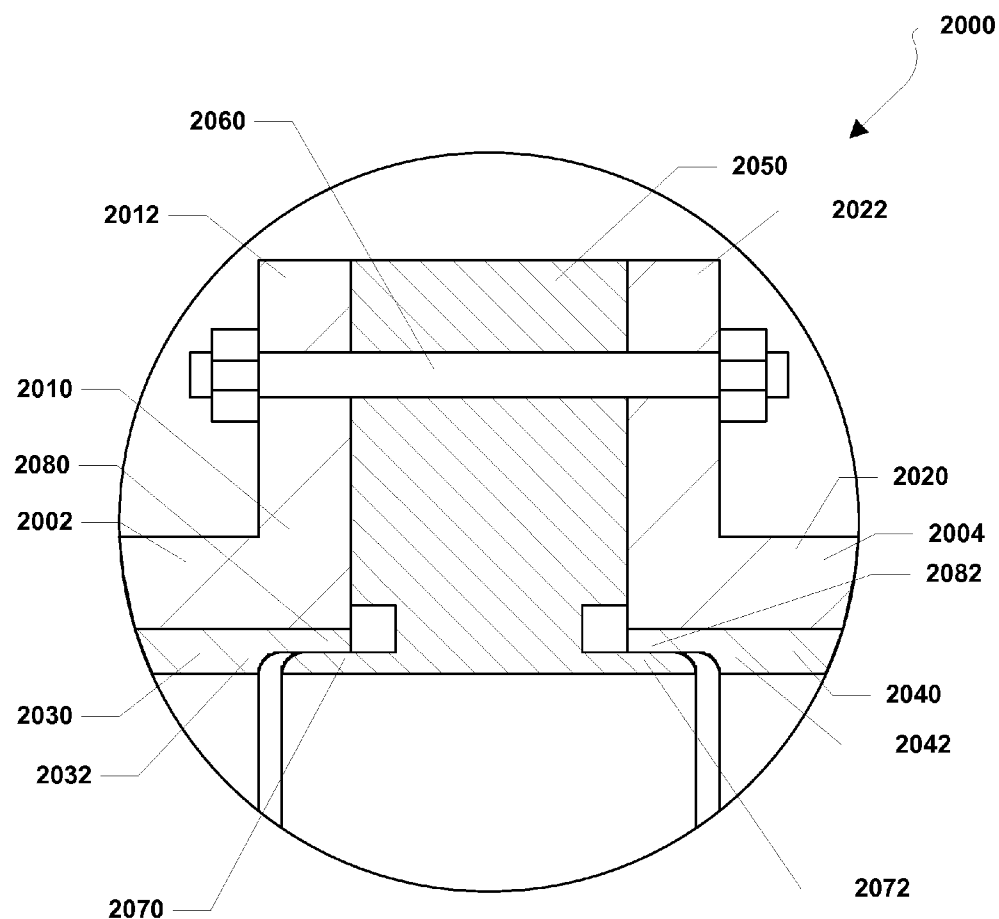
FIG. 21 is a detailed view of the tenth embodiment of the pipe joint taken at circle 21 in FIG. 20.

Referring now to FIG. 20 and FIG. 21, a tenth embodiment of a pipe joint is shown and is generally designated 2000. As shown in FIG. 20 and FIG. 21, the pipe joint 2000 can include a first pipe 2002 and a second pipe 2004. The first pipe 2002 can include an end 2010 and a flange 2012 can be formed on, or extend from, the end 2010 of the first pipe 2002. The second pipe 2004 can include an end 2020 and a flange 2022 can be formed on, or extend from, the end 2020 of the second pipe 2004.

FIG. 20 and FIG. 21 further shows that a first sleeve 2030 can be disposed within the first pipe 2002. The first sleeve 2030 can include an end 2032. A second sleeve 2040 can be disposed within the second pipe 2004. The second sleeve 2040 can include an end 2042. Further, as illustrated in FIG. 20 and FIG. 21, an annular ring 2050 can be installed within the pipe joint 2000 between the first sleeve 2030 and the second sleeve 2040 and between the first pipe 2002 and the second pipe 2004. Specifically, the annular ring 2050 can be sandwiched between the flange 2012 of the first pipe 2002 and the flange 2022 of the second pipe 2004. The pipe joint 2000 can also include a plurality of threaded fasteners 2060 the flanges 2012, 2022 of the pipes 2002, 2004 and the annular ring 2050. The threaded fasteners 2060 can compress the annular ring 2050 between the flanges 2012, 2022.

FIG. 21 depicts additional details of the pipe joint 2000. As shown in FIG. 21, the annular ring 2050 can include a first sealing element 2070 and a second sealing element 2072. In a particular embodiment, the first sealing element 2070 can be a flared sleeve formed in a first face of the annular ring 2050. The first sealing element 2070 can extend beyond the first face of the annular ring 2050. The second sealing element 2072 can also be a flared sleeve formed in a second face of the annular ring 2050—opposite the first face. As shown, the second sealing element 2072 can extend beyond the first face of the annular ring 2050.

FIG. 21 further shows that the end 2032 of the first sleeve 2030 can include a sealing element 2080. Moreover, the end 2042 of the second sleeve 2040 can include a sealing element 2082. The sealing element 2080 of the first sleeve 2030 can be a flared tube formed on the end 2032 of the first sleeve 2030. As shown in FIG. 21, the sealing element 2080 on the first sleeve 2030 can be fitted around a flared sleeve, e.g., the first sealing element 2070 of the annular ring 2050. Further, the sealing element 2080 of the first sleeve 2030 can be flared, or deformed, radially outward by the first sealing element 2070 of the annular ring 2050 as the sealing element 2080 of the first sleeve 2030 is installed around the first sealing element 2070 of the annular ring 2050.

The sealing element 2082 of the second sleeve 2040 can be a flared tube formed on the end 2042 of the second sleeve 2040. As shown in FIG. 21, the sealing element 2082 on the second sleeve 2040 can be fitted around a flared sleeve, e.g., the second sealing element 2072 of the annular ring 2050. Further, the sealing element 2082 of the second sleeve 2040 can be flared, or deformed, radially outward by the second sealing element 2072 of the annular ring 2050 as the sealing element 2082 of the second sleeve 2040 is installed around the second sealing element 2072 of the annular ring 2050.

As shown in FIG. 20 and FIG. 21, the sealing element 2080 on the end 2032 of the first sleeve 2030 can engage the first sealing element 2070 of the annular ring 2050. Also, the sealing element 2082 on the end 2042 of the second sleeve 2040 can engage the second sealing element 2072 of the annular ring 2050. A compressive force can be applied to the sleeves 2030, 2040 and the annular ring 2050 along a longitudinal axis 2090 and the sealing elements 2070, 2072 of the annular ring 2050 can cooperate with the sealing elements 2080, 2082 of the sleeves 2030, 2040 to create a seal and prevent the pipes 2002, 2004 from leaking at the pipe joint 2000.

Figure 22:
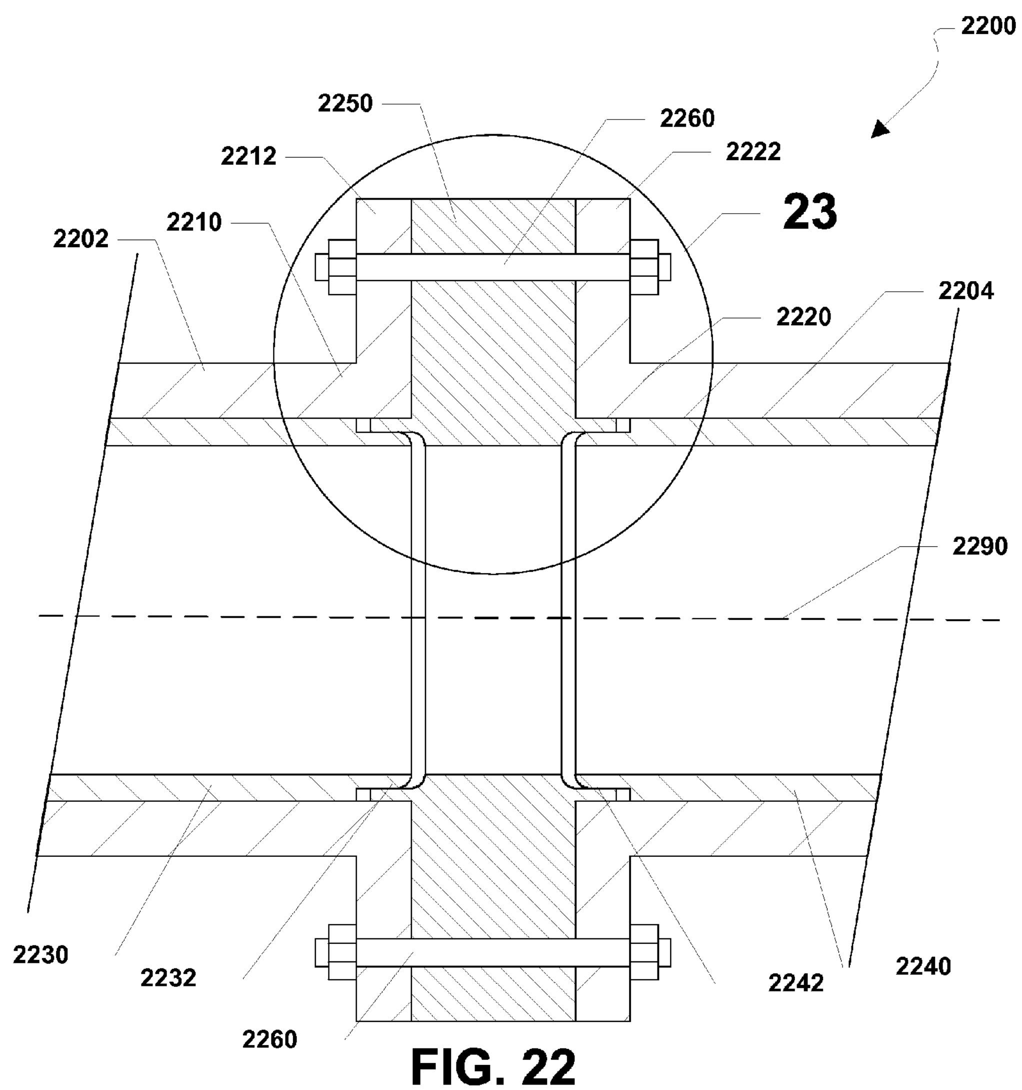
FIG. 22 is a cross-section view of an eleventh embodiment of a pipe joint.
Figure 23:
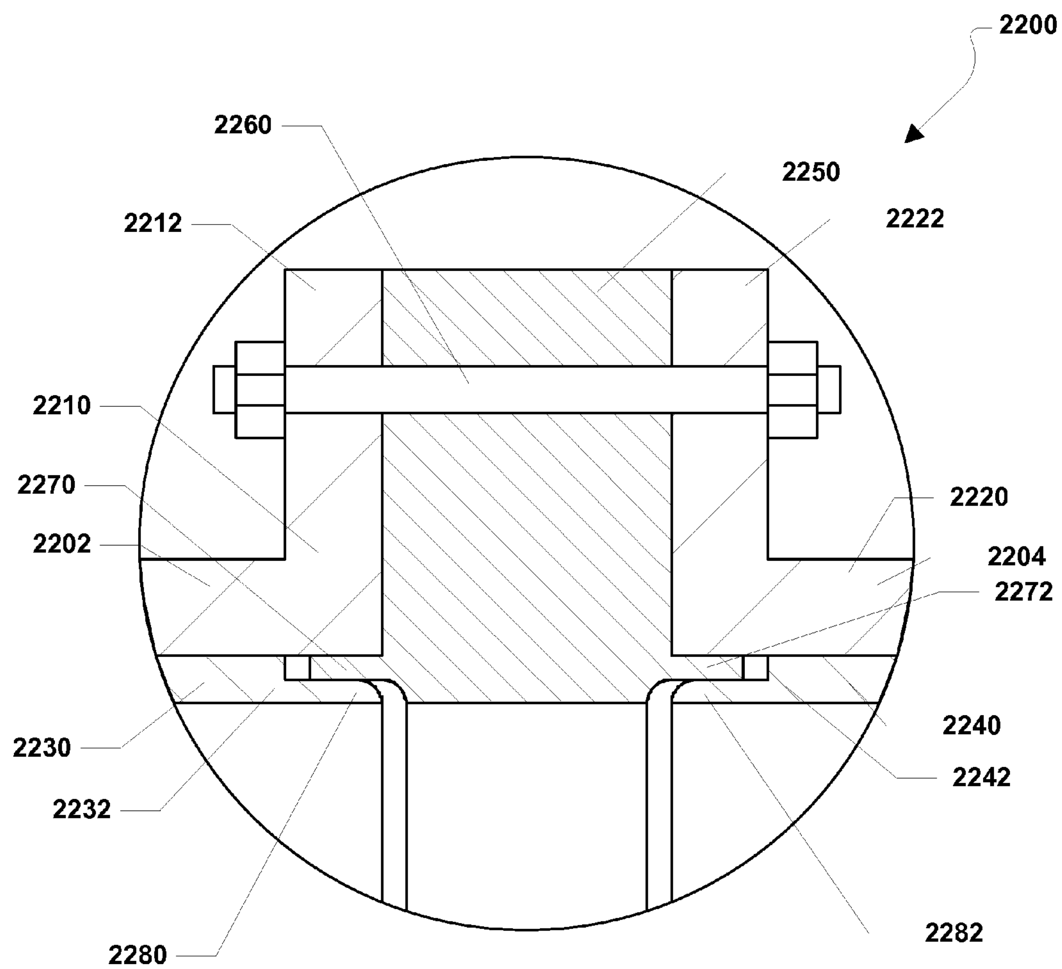
FIG. 23 is a detailed view of the eleventh embodiment of the pipe joint taken at circle 23 in FIG. 22.

Referring now to FIG. 22 and FIG. 23, a eleventh embodiment of a pipe joint is shown and is generally designated 2200. As shown in FIG. 22 and FIG. 23, the pipe joint 2200 can include a first pipe 2202 and a second pipe 2204. The first pipe 2202 can include an end 2210 and a flange 2212 can be formed on, or extend from, the end 2210 of the first pipe 2202. The second pipe 2204 can include an end 2220 and a flange 2222 can be formed on, or extend from, the end 2220 of the second pipe 2204.

FIG. 22 and FIG. 23 further shows that a first sleeve 2230 can be disposed within the first pipe 2202. The first sleeve 2230 can include an end 2232. A second sleeve 2240 can be disposed within the second pipe 2204. The second sleeve 2240 can include an end 2242. Further, as illustrated in FIG. 22 and FIG. 23, an annular ring 2250 can be installed within the pipe joint 2200 between the first sleeve 2230 and the second sleeve 2240 and between the first pipe 2202 and the second pipe 2204. Specifically, the annular ring 2250 can be sandwiched between the flange 2212 of the first pipe 2202 and the flange 2222 of the second pipe 2204. The pipe joint 2200 can also include a plurality of threaded fasteners 2260 the flanges 2212, 2222 of the pipes 2202, 2204 and the annular ring 2250. The threaded fasteners 2260 can compress the annular ring 2250 between the flanges 2212, 2222.

FIG. 23 depicts additional details of the pipe joint 2200. As shown in FIG. 23, the annular ring 2250 can include a first sealing element 2270 and a second sealing element 2272. In a particular embodiment, the first sealing element 2270 can be a flared tube extending from a first face of the annular ring 2250. The second sealing element 2272 can also be a flared tube that can extend from a second face of the annular ring 2250—opposite the first face.

FIG. 23 further shows that the end 2232 of the first sleeve 2230 can include a sealing element 2280. Moreover, the end 2242 of the second sleeve 2240 can include a sealing element 2282. The sealing element 2280 of the first sleeve 2230 can be a flared sleeve formed on the end 2232 of the first sleeve 2230. As shown in FIG. 23, the sealing element 2280 on the first sleeve 2230 can be fitted into a flared tube, e.g., the first sealing element 2270 of the annular ring 2250. Further, the first sealing element 2270 of the annular ring 2250 can be flared, or deformed, radially outward by the sealing element 2280 of the first sleeve 2230 as the sealing element 2280 of the first sleeve 2230 is inserted within the first sealing element 2270 of the annular ring 2250.

The sealing element 2282 of the second sleeve 2240 can be a flared sleeve formed on the end 2242 of the second sleeve 2240. As shown in FIG. 23, the sealing element 2282 on the second sleeve 2240 can be fitted into a flared tube, e.g., the second sealing element 2272 of the annular ring 2250. Further, the second sealing element 2272 of the annular ring 2250 can be flared, or deformed, radially outward by the sealing element 2282 of the second sleeve 2240 as the sealing element 2282 of the second sleeve 2240 is inserted within the second sealing element 2272 of the annular ring 2250.

As shown in FIG. 22 and FIG. 23, the sealing element 2280 on the end 2232 of the first sleeve 2230 can engage the first sealing element 2270 of the annular ring 2250. Also, the sealing element 2282 on the end 2242 of the second sleeve 2240 can engage the second sealing element 2272 of the annular ring 2250. A compressive force can be applied to the sleeves 2230, 2240 and the annular ring 2250 along a longitudinal axis 2290 and the sealing elements 2270, 2272 of the annular ring 2250 can cooperate with the sealing elements 2280, 2282 of the sleeves 2230, 2240 to create a seal and prevent the pipes 2202, 2204 from leaking at the pipe joint 2200.

Figure 24:
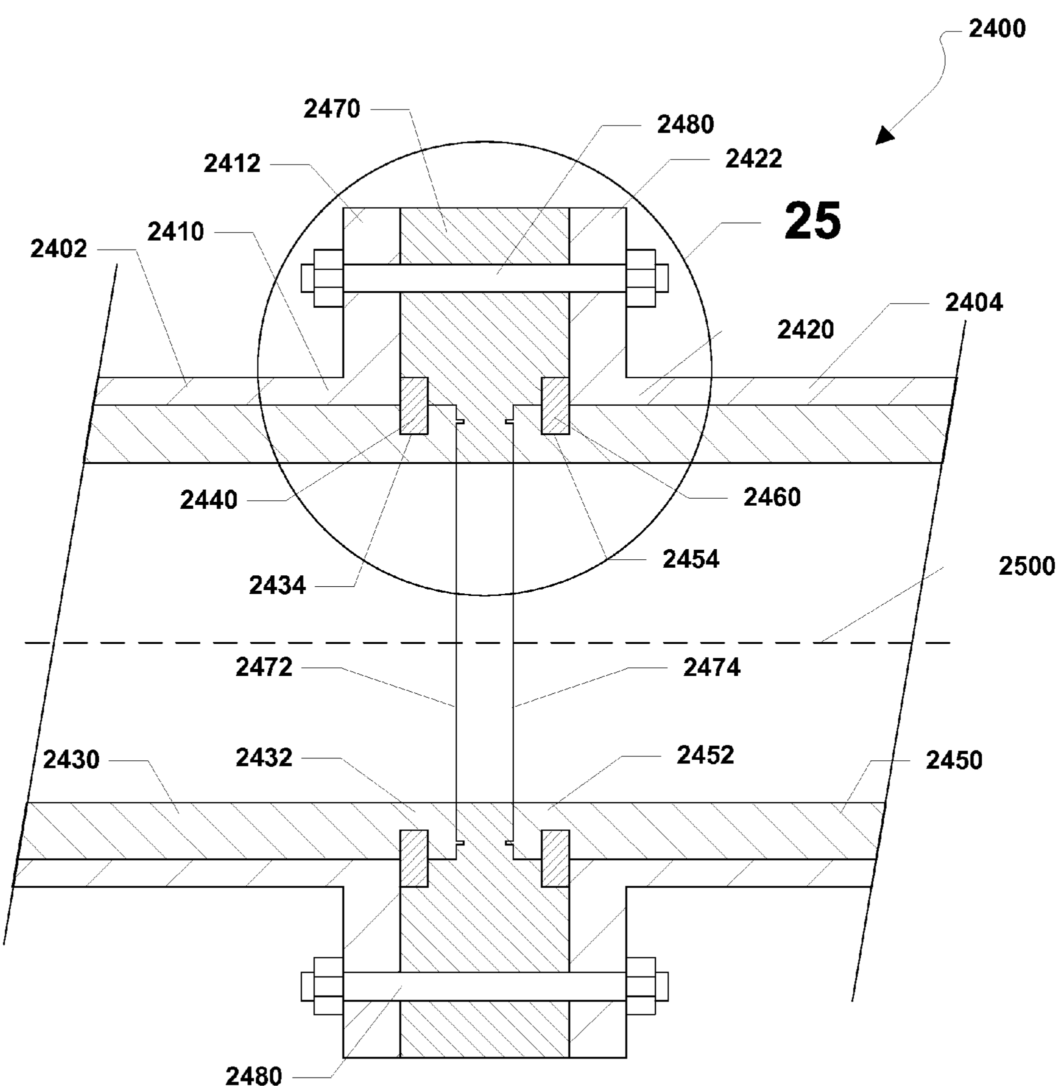
FIG. 24 is a cross-section view of a twelfth embodiment of a pipe joint.
Figure 25:
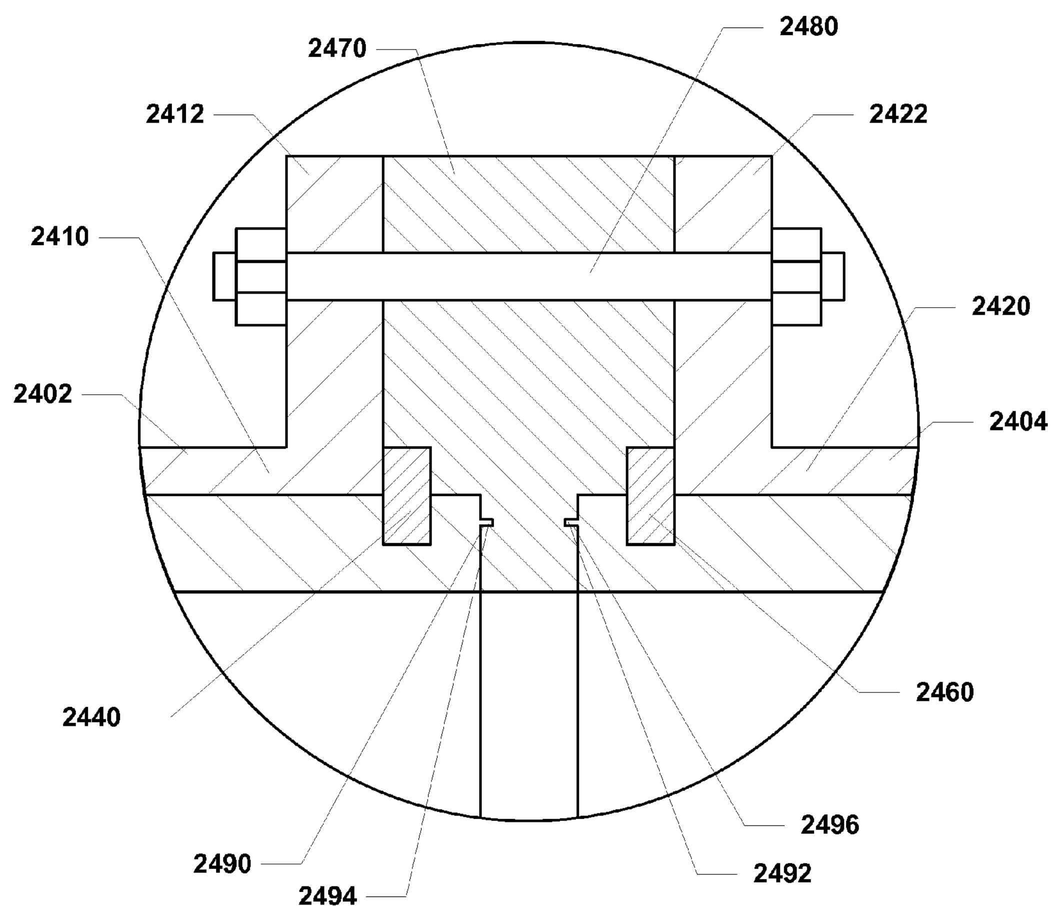
FIG. 25 is a detailed view of the twelfth embodiment of the pipe joint taken at circle 25 in FIG. 24.

Referring now to FIG. 24 and FIG. 25, a twelfth embodiment of a pipe joint is shown and is generally designated 2400. As shown in FIG. 24 and FIG. 25, the pipe joint 2400 can include a first pipe 2402 and a second pipe 2404. The first pipe 2402 can include an end 2410 and a flange 2412 can be formed on, or extend from, the end 2410 of the first pipe 2402. The second pipe 2404 can include an end 2420 and a flange 2422 can be formed on, or extend from, the end 2420 of the second pipe 2404.

FIG. 24 and FIG. 25 further shows that a first sleeve 2430 can be disposed within the first pipe 2402. The first sleeve 2430 can include an end 2432 and a groove 2434 can be formed around the end 2432 of the first sleeve 2430. Further, a first annular ring 2440 can be disposed around the end 2432 of the first sleeve 2430 within the groove 2434.

A second sleeve 2450 can be disposed within the second pipe 2404. The second sleeve 2450 can include an end 2452 and a groove 2454 can be formed around the end 2452 of the second sleeve 2450. Additionally, a second annular ring 2460 can be disposed around the end 2452 of the second sleeve 2450 within the groove 2454.

Further, as illustrated in FIG. 24 and FIG. 25, a third annular ring 2470 can be installed within the pipe joint 2400 between the first sleeve 2430 and the second sleeve 2450. Specifically, the third annular ring 2470 can be formed with a first sleeve pocket 2472 and a second sleeve pocket 2474. The first sleeve pocket 2472 can be formed to receive the end 2432 of the first sleeve 2430 and the first annular ring 2440. The second sleeve pocket 2474 can be formed to receive the end 2452 of the second sleeve 2450 and the second annular ring 2460. Further, as indicated in FIG. 24 and FIG. 25 the third annular ring 2470 can be sandwiched between the flange 2412 of the first pipe 2402 and the flange 2422 of the second pipe 2404. The pipe joint 2400 can also include a plurality of threaded fasteners 2480 that can extend through the flanges 2412, 2422 of the pipes 2402, 2404 and the third annular ring 2470. The threaded fasteners 2480 can compress the third annular ring 2470 between the flanges 2412, 2422.

FIG. 25 depicts additional details of the pipe joint 2400. As shown in FIG. 25, the third annular ring 2470 can include a first sealing element 2490 and a second sealing element 2492. In a particular embodiment, the first sealing element 2490 can be a groove that can extend substantially perpendicular into the third annular ring 2470 from the first sleeve pocket 2472. The second sealing element 2492 can also be a groove that can extend substantially perpendicular into the third annular ring 2470 from the second sleeve pocket 2474.

FIG. 25 further shows that the end 2432 of the first sleeve 2430 can include a sealing element 2494. Moreover, the end 2452 of the second sleeve 2450 can include a sealing element 2496. The sealing element 2494 on the end 2432 of the first sleeve 2430 can include a tongue that can extend from the end 2432 of the first sleeve 2430. The tongue can be configured, i.e., sized and shaped, to fit into and engage a groove, e.g., the first sealing element 2490 of the third annular ring 2470. Similarly, the sealing element 2496 on the end 2452 of the second sleeve 2450 can include a tongue that can extend from the end 2452 of the second sleeve 2470. The tongue can be configured, i.e., sized and shaped, to fit into and engage a tongue, e.g., the second sealing element 2496 of the third annular ring 2470.

As shown in FIG. 24 and FIG. 25, the sealing element 2494 on the end 2432 of the first sleeve 2430 can engage the first sealing element 2490 of the third annular ring 2470. Also, the sealing element 2496 on the end 2452 of the second sleeve 2450 can engage the second sealing element 2492 of the third annular ring 2470. The threaded fasteners 2480 can compress the third annular ring 2470 between the flanges 2412, 2422 and apply a compressive force on the sealing elements 2490, 2492, 2494, 2496 via the annular rings 2440, 2460.

In a particular embodiment, the sealing element 2494 on the end 2432 of the first sleeve 2430 and the first sealing element 2490 of the third annular ring 2470 can form a first complementary engagement structure that is configured to provide a first seal interface within the pipe joint 2400 when the sleeves 2430, 2450, and the annular rings 2440, 2460, 2470 are compressed. The sealing element 2496 on the end 2452 of the second sleeve 2450 and the second sealing element 2492 of the third annular ring 2470 can form a second complementary engagement structure that is configured to provide a second seal interface within the pipe joint 2400 when the sleeves 2430, 2450 and the annular rings 2440, 2460, 2470 are compressed.

Figure 26:
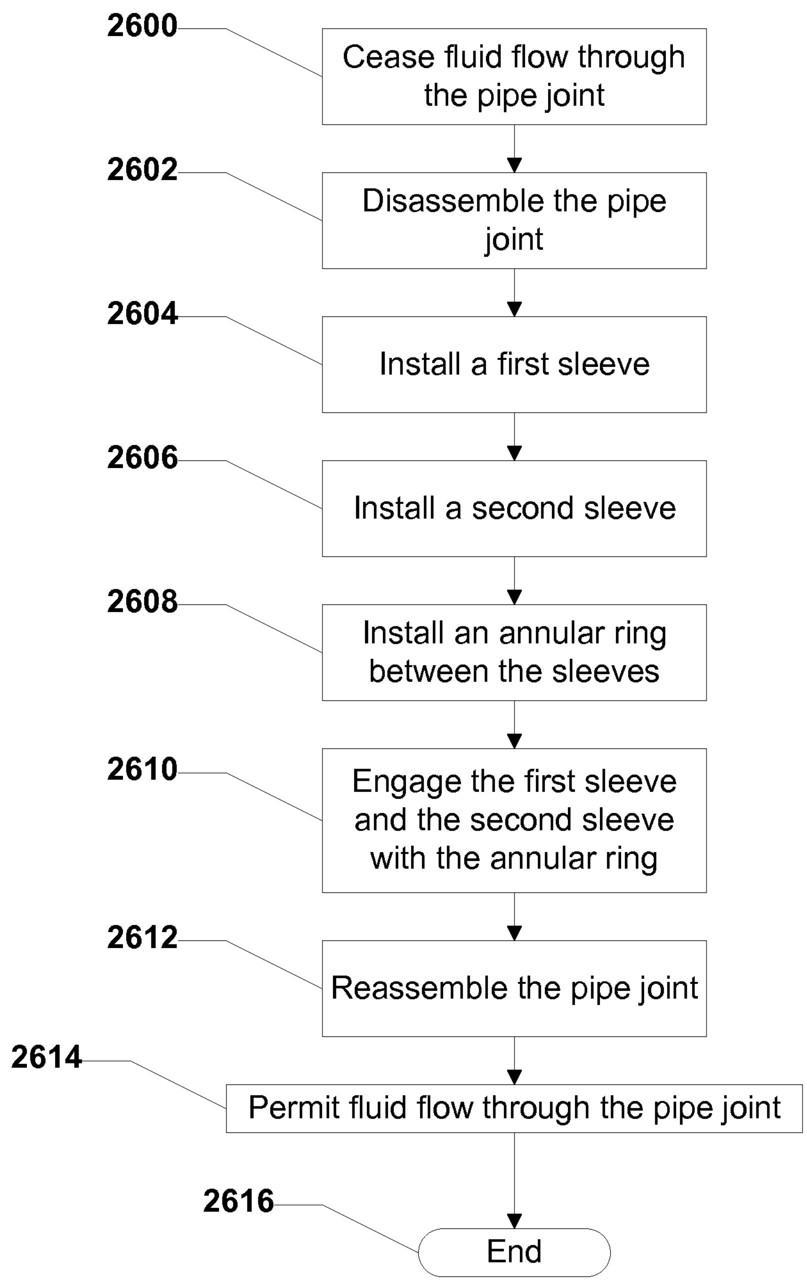
FIG. 26 is a flow chart illustrating a method of repairing, or modifying, a valve.

Referring now to FIG. 26, a method of repairing, or modifying, a pipe joint is shown and commences at block 2600. In a particular embodiment, the pipe joint being repaired can be a pipe joint having a flange of a first pipe connected to a flange of a second pipe. At block 2600, fluid flow through the pipe joint can be ceased. At block 2602, the pipe joint can be disassembled. For example, the pipe joint can be disassembled by loosening and removing a series of bolts installed through the flanges.

Moving to block 2604, a first sleeve can be installed within a first pipe. Thereafter, at block 2606, a second sleeve can be installed within a second pipe. At block 2608, an annular ring can be installed between the sleeves. Further, at block 2610 the first sleeve and the second sleeve can be engaged with the annular ring. At block 2612, the pipe coupling can be reassembled. Moreover, at block 2614, fluid flow can be permitted through the pipe joint. The method can then end at block 2616.

One of more embodiments, described herein, can be installed within a pipe assembly in order to seal the pipe assembly. Further, one or more embodiments can be used in corrosive environments in which resilient seals cannot be used. Further, embodiments herein provide inner sealing interfaces within a pipe joint that are distanced from flange sealing interfaces. Spacing the inner sealing interfaces from the central axis can decrease leakage of the pipe assembly. Existing pipe assemblies can be retrofitted in order to include one or more of the embodiments described herein. As such, existing pipe assemblies that are not corrosion resistant can be made corrosion resistant. Further, existing pipe assemblies that may be deteriorating can be retrofitted within one or more of the embodiments described herein in order to prolong the life of the deteriorating pipe assembly.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A pipe joint, comprising:

a first pipe comprising a first flange;

a second pipe comprising a second flange;

a first sleeve installed within the first pipe;

a second sleeve installed within the second pipe;

a one piece annular ring positioned between and in direct contact with the flange of the first pipe and the flange of the second pipe, wherein the annular ring comprises a first rectangular hub that extends into the first pipe substantially parallel with the first pipe and a second rectangular hub that extends into the second pipe substantially parallel with the second pipe;

a plurality of threaded fasteners installed through the flange of the first pipe, through an opening extending longitudinally within the annular ring, and through the flange of the second pipe, wherein the plurality of threaded fasteners secure and compress the annular ring between the flange of the first pipe and the flange of the second pipe;

a first complementary engagement structure comprising a first complementary feature extending from an end surface of one of the hub or first sleeve and a second complementary feature extending from an end surface of the other of the hub or first sleeve, wherein the first and second complementary features are substantially parallel with the first sleeve, and wherein the first complementary engagement structure provides a first seal interface within the pipe joint; and a second complementary engagement structure comprising a first complementary feature extending from an end surface of one of the hub or second sleeve and a second complementary feature extending from an end surface of the other of the hub or second sleeve, wherein the first and second complementary features are substantially parallel with the second sleeve, and wherein the second complementary engagement structure provides a second seal interface within the pipe joint.

2. The pipe joint of claim 1, wherein the first complementary feature of the first complementary engagement structure comprises one of a tongue or a groove.

3. The pipe joint of claim 2, wherein the second complementary feature of the first complementary engagement structure comprises the other of a tongue or groove.

4. The pipe joint of claim 1, wherein the first complementary feature of the second complementary engagement structure comprises one of a tongue or a groove.

5. The pipe joint of claim 4, wherein the second complementary feature of the second complementary engagement structure comprises the other of a tongue or groove.

6. The pipe joint of claim 1, further comprising:

a central axis along the midpoint of the annular ring;

a first flange interface established at a distance, DF1, from the central axis; and a first sleeve interface established at a distance, DS1, from the central axis, wherein DS1 is equal to 1.25×DF1.

7. The pipe joint of claim 6, wherein DS1 is not greater than 3.0×DF1.

8. The pipe joint of claim 6, further comprising:

a second flange interface established at a distance, DF2, from the central axis; and a second sleeve interface established at a distance, DS2, from the central axis, wherein DS2 is equal to 1.25×DF2.

9. The pipe joint of claim 8, wherein DS1 is not greater than 3.0×DF2.

10. The pipe joint of claim 1, wherein the first complementary engagement structure is configured to provide the first seal interface when the first sleeve, the second sleeve, and the annular ring are compressed.

11. The pipe joint of claim 10, wherein the first sleeve, the second sleeve, and the annular ring are compressed along a longitudinal axis.

12. The pipe joint of claim 1, wherein the second complementary engagement structure is configured to provide the second seal interface when the first sleeve, the second sleeve, and the annular ring are compressed.

13. The pipe joint of claim 12, wherein the first sleeve, the second sleeve, and the annular ring are compressed along a longitudinal axis.

14. A pipe joint, comprising:

a first pipe comprising a first flange and a first sleeve installed within the first pipe;

a second pipe comprising a second flange and a second sleeve installed within the second pipe;

a one piece annular ring having a longitudinal axis, wherein the annular ring comprises a first rectangular hub extending from the ring substantially parallel with the longitudinal axis and a second rectangular hub extending from the ring opposite the first hub;

a plurality of threaded fasteners installed through the flange of the first pipe, through an opening extending longitudinally within the annular ring, and through the flange of the second pipe, wherein the plurality of threaded fasteners secure and compress the annular ring between the flange of the first pipe and the flange of the second pipe;

a first complementary engagement structure formed between the first sleeve and the first hub, wherein the first complementary engagement structure comprises one of a tongue or a groove formed on an outer surface of the first hub and the other of a tongue or a groove formed on an end of the first sleeve; and a second complementary engagement structure formed between the second sleeve and the second hub, wherein the second complementary engagement structure comprises one of a tongue or a groove formed on an outer surface of the second hub and the other of a tongue or a groove formed on an end of the second sleeve.

* * * * *